United States Patent
Liu et al.

(10) Patent No.: US 10,726,843 B2
(45) Date of Patent: Jul. 28, 2020

(54) METHODS AND SYSTEMS FOR RESPONDING TO INQUIRIES BASED ON SOCIAL GRAPH INFORMATION

(71) Applicant: Facebook, Inc., Menlo Park, CA (US)

(72) Inventors: Xiaohu Liu, Bellevue, WA (US); Benoit F. Dumoulin, Palo Alto, CA (US); Baiyang Liu, Issaquah, WA (US)

(73) Assignee: FACEBOOK, INC., Menlo Park, CA (US)

( * ) Notice: Subject to any disclaimer, the term of this patent is extended or adjusted under 35 U.S.C. 154(b) by 58 days.

(21) Appl. No.: 15/848,190

(22) Filed: Dec. 20, 2017

(65) Prior Publication Data
US 2019/0189126 A1    Jun. 20, 2019

(51) Int. Cl.
*G06Q 10/10* (2012.01)
*G10L 15/26* (2006.01)
(Continued)

(52) U.S. Cl.
CPC ............ *G10L 15/265* (2013.01); *G06F 40/30* (2020.01); *G06F 40/35* (2020.01); *G06F 40/56* (2020.01);
(Continued)

(58) Field of Classification Search
CPC .... G06Q 50/01; G06F 16/9535; H04L 51/046
See application file for complete search history.

(56) References Cited

U.S. PATENT DOCUMENTS 7,949,611 B1 *  5/2011  Nielsen ............... G06F 21/6245
                                                    705/319
8,782,080 B2 *  7/2014  Lee .................... G06F 16/24534
                                                    707/771
(Continued)

FOREIGN PATENT DOCUMENTS

EP        3122001 A1    1/2017
WO     2015148584 A1   10/2015

OTHER PUBLICATIONS

Hattori, Fumio, et al. "Socialware: Multiagent systems for supporting network communities." Communications of the ACM 42.3 (1999): 55. (Year: 1999).*

(Continued)

*Primary Examiner* — Jialong He

(57) ABSTRACT

Exemplary embodiments relate to improvements in digital assistants incorporating personalization based on social network data. Various aspects of the agent, such as the agent's voice, language style, and avatar may be personalized. Personalization may be applied to components of an agent's architecture (e.g., the virtual agent's language model, natural language generator, voice generation component, etc.). Moreover, by interfacing with the social network's social graph, the agent may be provided with information useful to performing certain tasks (e.g., a calendar for scheduling, food preferences for ordering tasks, etc.). An agent may be provided (and personalized) for a single user, or a group of users (e.g., a family). The agent can be personalized to anyone, which may allow (e.g.) for the agent to represent a (Continued)

celebrity or a person who is not currently available in interactions with others. Different agents can talk to each other, e.g. for purposes of scheduling meetings.

18 Claims, 12 Drawing Sheets

(51) Int. Cl.
  *G10L 15/30* (2013.01)
  *G10L 13/04* (2013.01)
  *G10L 15/22* (2006.01)
  *G06Q 50/00* (2012.01)
  *G06F 40/30* (2020.01)
  *G06F 40/35* (2020.01)
  *G06F 40/56* (2020.01)
(52) U.S. Cl.
  CPC ............ *G06Q 50/01* (2013.01); *G10L 13/043* (2013.01); *G10L 15/22* (2013.01); *G10L 15/30* (2013.01)

(56) References Cited

U.S. PATENT DOCUMENTS

| | | | | |
|---|---|---|---|---|
| 2004/0225650 | A1* | 11/2004 | Cooper | H04M 3/527 |
| 2008/0235024 | A1* | 9/2008 | Goldberg | G10L 13/033 704/260 |
| 2010/0005518 | A1* | 1/2010 | Tirpak | H04L 67/306 726/6 |
| 2011/0184886 | A1* | 7/2011 | Shoham | G06Q 30/02 705/400 |
| 2014/0129651 | A1* | 5/2014 | Gelfenbeyn | H04L 51/32 709/206 |
| 2014/0164317 | A1* | 6/2014 | Lynch | G06Q 10/02 707/609 |
| 2014/0164953 | A1 | 6/2014 | Lynch et al. | |
| 2014/0172917 | A1* | 6/2014 | Coroy | G06F 21/6218 707/783 |
| 2014/0244712 | A1* | 8/2014 | Walters | H04L 67/10 709/202 |
| 2014/0245140 | A1* | 8/2014 | Brown | G06Q 10/06 715/708 |
| 2014/0278605 | A1* | 9/2014 | Borucki | G06Q 30/0617 705/5 |
| 2015/0139416 | A1* | 5/2015 | Skiba | H04M 3/5233 379/265.12 |
| 2015/0169284 | A1 | 6/2015 | Duast et al. | |
| 2015/0186154 | A1* | 7/2015 | Brown | G06F 3/04817 715/706 |
| 2016/0210960 | A1* | 7/2016 | Kim | H04W 4/18 |
| 2016/0285790 | A1 | 9/2016 | Szeto et al. | |
| 2017/0017694 | A1 | 1/2017 | Roytman et al. | |
| 2017/0026318 | A1 | 1/2017 | Daniel et al. | |
| 2017/0041183 | A1* | 2/2017 | Hadad Segev | G06Q 10/06 |
| 2017/0075944 | A1* | 3/2017 | Overman | H04W 4/21 |
| 2017/0270006 | A1 | 9/2017 | Kandylas et al. | |
| 2018/0096072 | A1* | 4/2018 | He | G06F 3/0481 |

OTHER PUBLICATIONS

International Search Report for the International Patent Application No. PCTUS2017068442, dated Sep. 20, 2018.
European Search Report for European Patent Application No. EP18180854, dated Aug. 29, 2018.

* cited by examiner

Agent Customization Logic
300

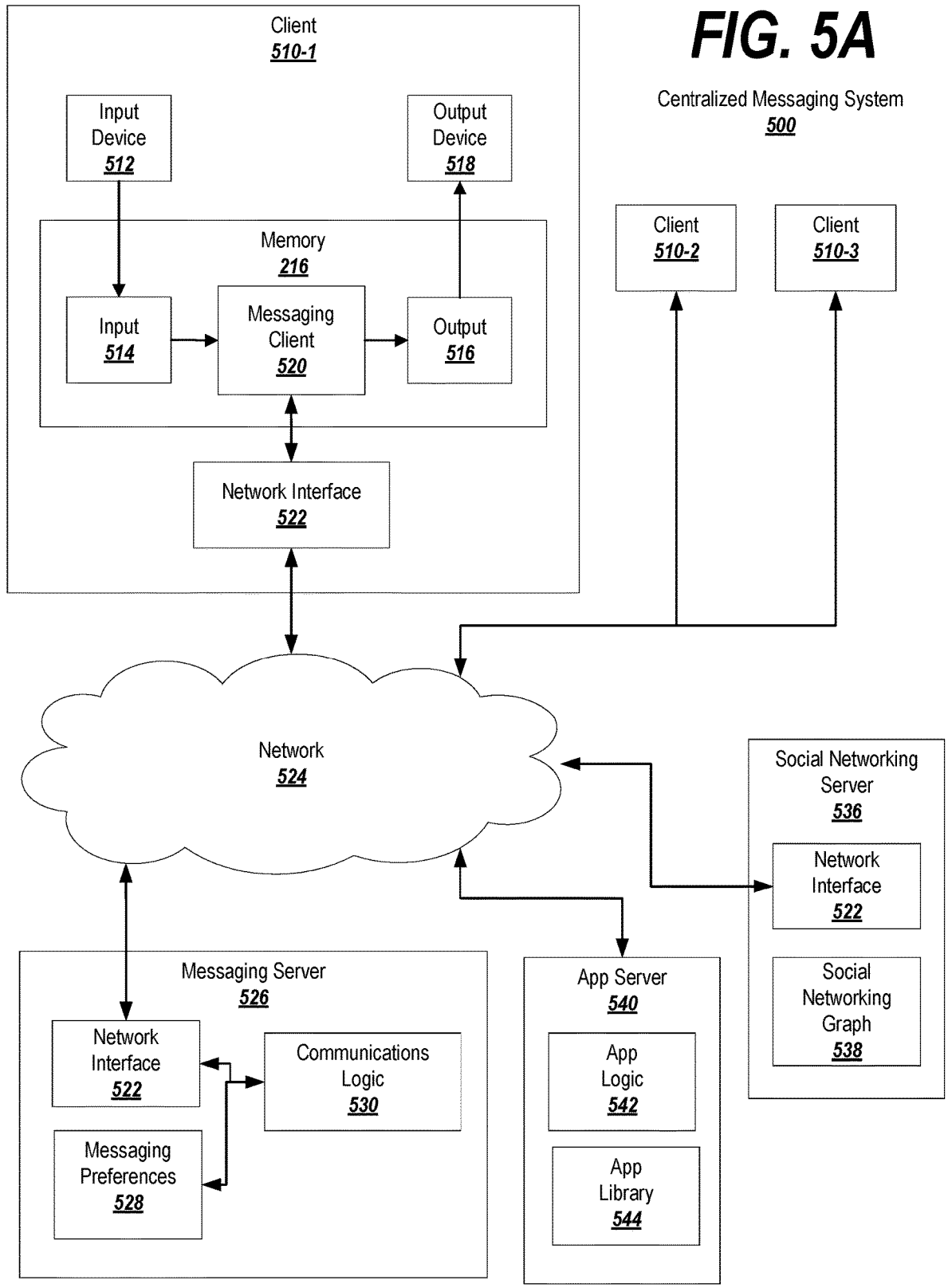

Distributed Messaging System 550

METHODS AND SYSTEMS FOR RESPONDING TO INQUIRIES BASED ON SOCIAL GRAPH INFORMATION

BACKGROUND

As artificial intelligence, voice recognition, and related technologies have advanced, so-called "virtual assistants" have become popular. These virtual assistants may respond to commands from a user to, e.g., retrieve information from the internet, add items to a to-do list, control smart home devices, etc.

BRIEF DESCRIPTION OF THE DRAWINGS

FIG. 5A is a block diagram providing an overview of a system including an exemplary centralized communications service;

DETAILED DESCRIPTION

Figure 1:
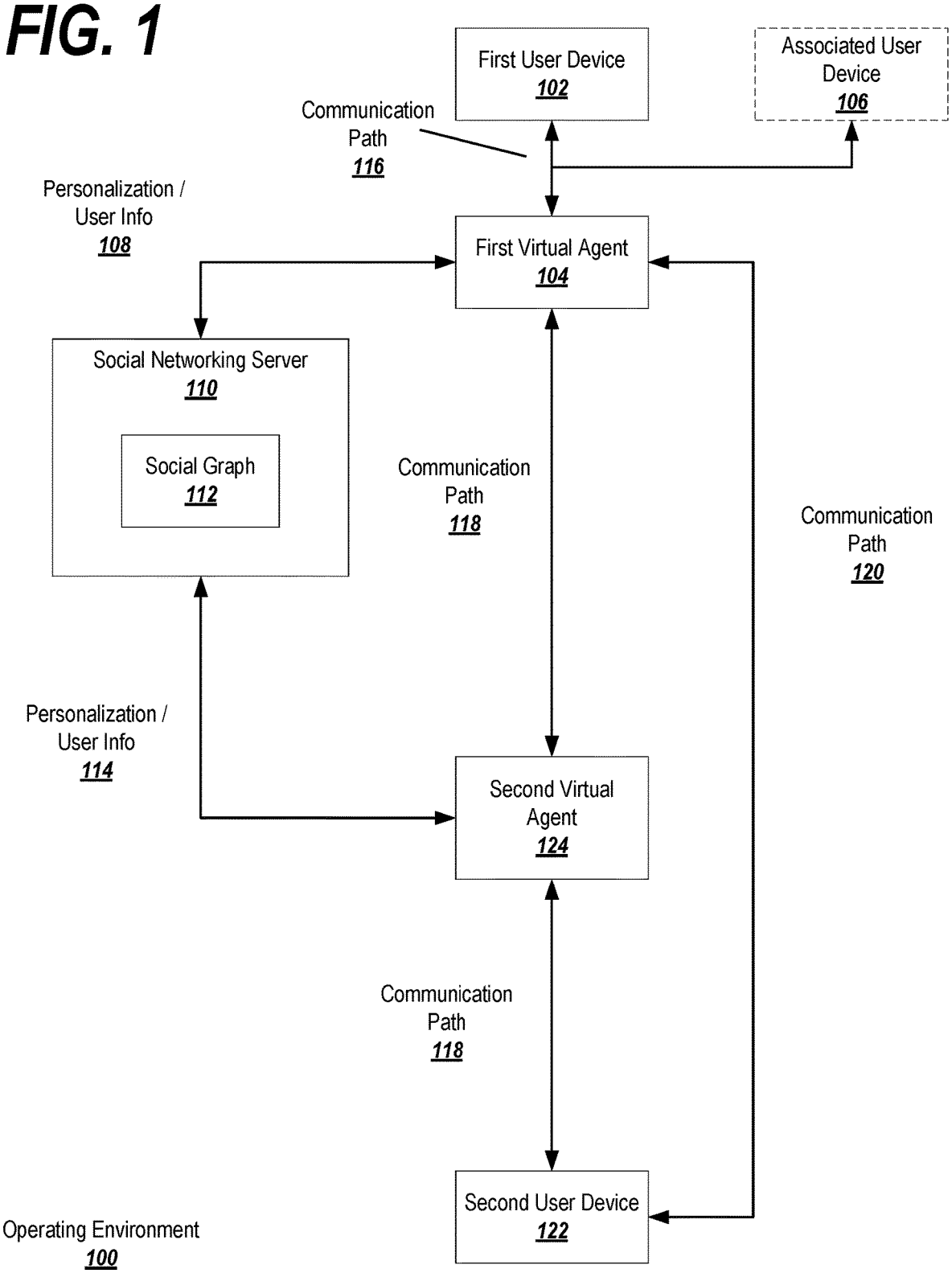
FIG. 1 depicts an exemplary operating environment for a virtual agent.

Existing virtual assistants suffer from several limitations. For example, virtual assistants typically perform predefined tasks upon receiving a user command. To this extent, they reduce the number of tasks that a user needs to perform manually. However, they cannot take initiative on their own, for example, to coordinate with other users or assistants.

Exemplary embodiments relate to virtual agents that act as a proxy for the user on whose behalf they operate. As opposed to a virtual assistant, a virtual agent may have access to information about the user, and may take actions on the user's behalf with minimal or no required user input. For example, a virtual agent for a first user may interact directly with a second user (or with the second user's virtual agent) to set up a meeting based on the first user's calendar availability. In another example, a user may instruct their virtual agent to "order dinner," and the virtual agent may select an appropriate restaurant and meal based on known information about the user and then order the meal for delivery automatically.

Other exemplary uses could include automatically ordering birthday gifts for friends or family members as that person's birthday approaches (potentially coordinating with their own virtual agents to identify preferences or wish lists), coordinating activities with friends, or simply holding a conversation with another virtual agent. This latter example might be used, for instance, in cases where the other user is unavailable to speak, as when they are away on an extended absence, sick, etc.

These tasks may be accomplished based on preset settings or user preferences and may be done without needing to receive input from the user associated with the virtual agent (or by receiving minimal input, such as offering options for timing and/or by offering a confirmation option to the first user).

Another problem with existing virtual assistants is that each virtual assistant (e.g., APPLE's® SIRI®, MICROSOFT's® CORTANA®, SAMSUNG's® BIXBY®, AMAZON's® ALEXA®, GOOGLE's® ASSISTANT® and NOW®, among others) is designed with its own voice and personality. For example, SRI® speaks and acts like SRI® on each device implementing this particular assistant. However, if a virtual agent is intended to act as a proxy for the user, as described above, such impersonal behavior may be undesirable. It would be preferable, for example, if the virtual agent spoke and acted in a similar manner to the user on whose behalf the virtual agent operates. Alternatively, or in addition, the virtual agent may adopt customized speaking habits that are based on the preferences and/or styles of the user, without necessarily adopting the user's speaking style directly. This may be useful when the virtual agent represents multiple people, such as a family or business unit: the virtual agent can adopt a speaking style or mannerisms that are consistent with the group members without necessarily adopting the style of a particular group member.

In another usage example, users could interact with a celebrity's virtual agent, which adopts the celebrity's mannerisms and holds conversations as though it were the celebrity. In a similar vein, virtual agents may be created for historical or fictional people, allowing users to interact with a favorite character from a certain time period, book, or movie. In this case, the virtual agent may be customized based on a contrived or fake profile from a social network, such as a constructed persona having connections into the social network's social graph based on what an administrator, author, etc. believes the character would like/dislike and the interactions the character might have. The administrator, author, etc. may have fake nodes constructed in the social graph that do not have a real-world equivalent, allowing the virtual agent to be further fleshed out (e.g., "Captain Nemo just checked in at Atlantis," or "George Washington reacted to a post by King George III").

In addition to personalization based on the social graph, the agent may be provided with information useful to performing certain tasks (e.g., a calendar for scheduling, food preferences for ordering tasks, location check-in data, etc.) via the social network's social graph.

Because a virtual agent, unlike a virtual assistant, likely has access to a great deal of personal information through the user's social network, it may be necessary to restrict which information is used and/or revealed in responding to requests. As such, the virtual agent may control information that is used or surfaced based on the permissions of the requesting user to access the data in the social network. For instance, if the requesting user is not authorized to see the requestee's calendar or event information in the social network, then the requestee's virtual agent may refrain from revealing calendar information in responding to requests (e.g., the virtual agent may inform the requestor that it is not authorized to schedule meetings based on the requestor's access rights). Alternatively or in addition, the virtual agent may use the relevant social networking data to perform a task without revealing the information to a non-authorized user. Continuing with the above example, the virtual agent might be able to schedule a meeting with the requestor for Friday at 4:00 PM, but might not inform the requestor that the requestee has a conflicting appointment on Friday at 2:00 PM.

These and other features of exemplary embodiments are described in more detail below. Before further discussing the exemplary embodiments, however, a general note regarding data privacy is provided.

A Note on Data Privacy

Some embodiments described herein make use of training data or metrics that may include information voluntarily provided by one or more users. In such embodiments, data privacy may be protected in several ways.

For example, the user may be required to opt in to any data collection before user data is collected or used. The user may also be provided with the opportunity to opt out of any data collection. Before opting in to data collection, the user may be provided with a description of the ways in which the data will be used, how long the data will be retained, and the safeguards that are in place to protect the data from disclosure.

Any information identifying the user from which the data was collected may be purged or disassociated from the data. In the event that any identifying information needs to be retained (e.g., to meet regulatory requirements), the user may be informed of the collection of the identifying information, the uses that will be made of the identifying information, and the amount of time that the identifying information will be retained. Information specifically identifying the user may be removed and may be replaced with, for example, a generic identification number or other non-specific form of identification.

Once collected, the data may be stored in a secure data storage location that includes safeguards to prevent unauthorized access to the data. The data may be stored in an encrypted format. Identifying information and/or non-identifying information may be purged from the data storage after a predetermined period of time.

Although particular privacy protection techniques are described herein for purposes of illustration, one of ordinary skill in the art will recognize that privacy protected in other manners as well. Further details regarding data privacy are discussed below in the section describing network embodiments.

Operating Environment

FIG. 1 depicts an exemplary operating environment 100 for a virtual agent. The operating environment 100 illustrates examples of how human users may interact with virtual agents through their devices.

For example, a first user may use their first user device 102, or an associated user device 106, to send an inquiry or a request to their first virtual agent 104. The first virtual agent 104 may be personalized for the first user based on social networking information that the first virtual agent 104 has access to on a social networking server 110. For example, the personalization of the first virtual agent 104 may be based on a social graph 112 that is on or accessible to the social networking server 110, as will be described further below.

The social networking server 110 may be one or more devices that support a social networking service, a messaging service, a calling service, media sharing services, combinations thereof, or other services that allow a user to interact with other users and/or entities. The social graph 112 represents relationships among the users of a social networking service as well as relationships of users to concepts found within the social network, and is described in more detail with respect to FIG. 5C.

A user may interact with different entities within the social network via their virtual agent 104. Inquiry/response path 116 may represent an interaction between the first user and the first virtual agent 104. For example, the first user may, via the first user device 102, request that the first virtual agent 104 order dinner. The first virtual agent 104 may respond by selecting a preferred restaurant, communicating with the restaurant over a network to order a preferred meal, and arrange payment from an account of the user to the restaurant. The personalization/user information data 108 used by the first virtual agent 104, e.g. a list of preferred restaurants, a list of preferred meals, and payment account information, may be generated and stored during the process of personalization of the virtual agent 104. The stored personalization information 108 may be stored on the user device, or on a remote server accessible to the virtual agent such as the social networking server 110. The virtual agent 104 may be stored and executed locally on the user device 102, or may be stored and executed from the social networking server 110, or on a third-party server (not shown).

In another example, two users, e.g. the first user and a second user, may communicate be delegating their respective virtual agents 104 and 124 to communicate on the users' behalf on inquiry response path 118. For example, the first user may delegate receiving and scheduling meeting requests from others to the first virtual agent 104. The second user may instruct its second virtual agent 124 to request a meeting with the first user. The second virtual agent 124 may access personalization information 114 for the second user to lookup when the second user have openings in a calendar or schedule. The second virtual agent 124 may send a meeting request to the first virtual agent 104 and the two virtual agents may coordinate, using their respective personalization information, to identify and schedule a meeting time.

In another example, the second user may communicate directly with the first virtual agent 104 via the second user device 122 on the inquiry/response path 120. Either the first virtual agent 104 or the second user may initiate communication, for example, via a message or call to or from the second user device 122. The first virtual agent 104 may be personalized, for example, to receive any incoming communication to the first user and attempt to respond or handle the communication before escalating the communication to the first user.

Exemplary Architecture

Figure 2:
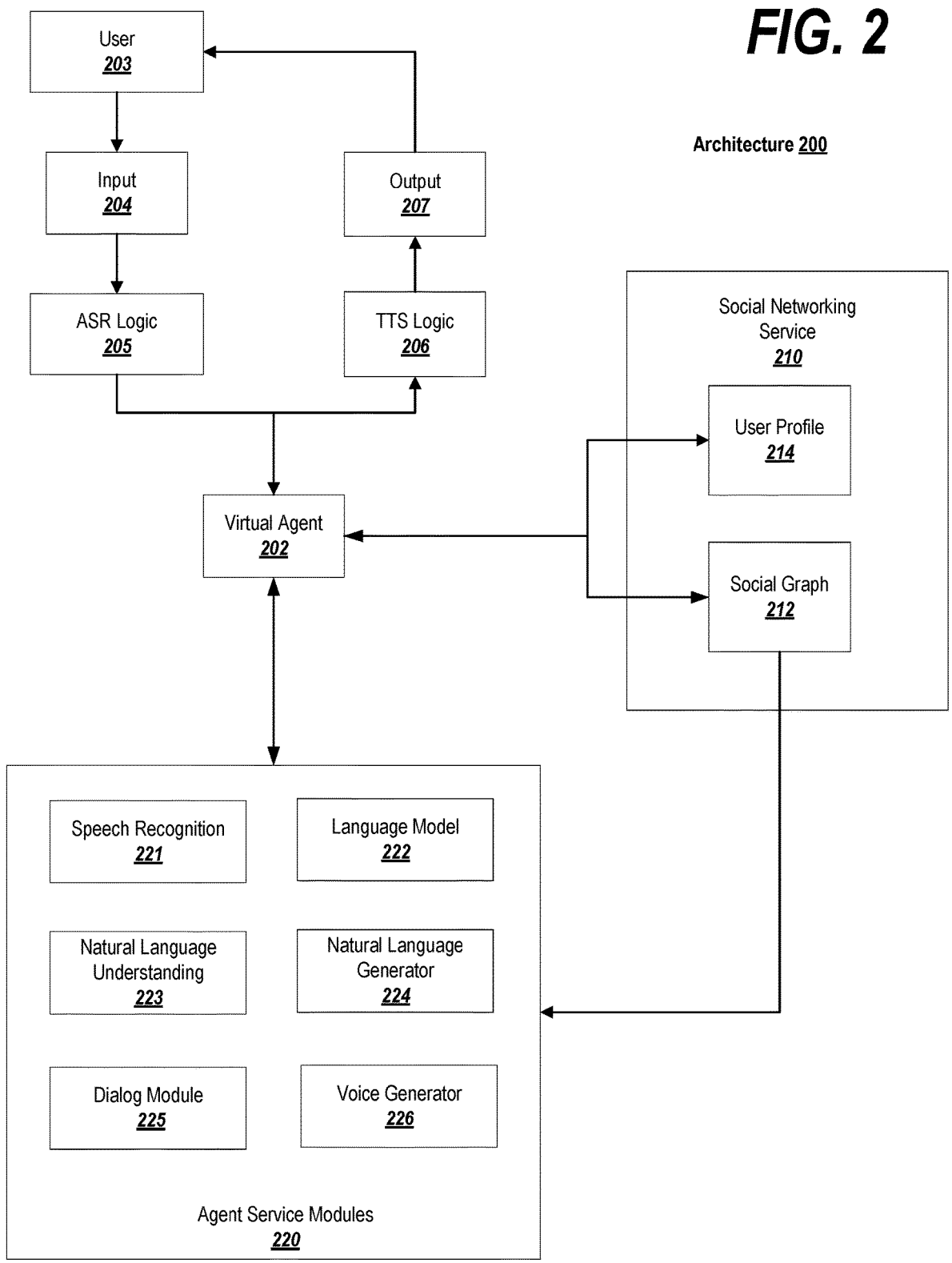
FIG. 2 depicts an exemplary architecture for a virtual agent according to an embodiment.

FIG. 2 depicts an exemplary architecture 200 for a virtual agent according to an embodiment. FIG. 2 illustrates an example of a message flow that might be used by a virtual agent 202 communicating with or for a user. The virtual agent 202 may use one or more agent service modules 220.

In the illustrated example, the user 203 may produce an input 204. The input 204 could be, e.g., an inquiry ("when is Matt free on Tuesday?") or a request ("schedule a meeting with Matt on Tuesday"). The input 204 may be in the form of text, such as text input from a keyboard via a web browser or other application. The input 204 may also take other forms, such as an audio recording, writing provided directly to a computing system through a stylus or electronic pen, writing indirectly provided to a computing system (e.g. by scanning a handwritten or typed document), a photograph (e.g. a photograph of a sign), speech captured by a microphone on the device, and other suitable types of input. In order to provide the input 204, the user 203 may interact with the system via a graphical user interface displayed on a computing device screen (or active touch screen), a pointing device such as a mouse or pen, a microphone, and/or a keyboard.

In order to handle multiple different types of inputs 204, logic may be provided for converting the input 204 into text, when the input 204 is not ASCII text. For example, automatic speech recognition (ASR) logic 205 may be configured to convert input audio into text. When needed, the automatic speech recognition (ASR) logic 205 may convert the input 204 into text that the virtual agent 202 can understand. In order to convert an audio recording to text, the ASR logic 205 may utilize an acoustic model, an ASR class-based language model, and a recognition lexicon model. One example of suitable ASR logic is the "Ninja" speech recognizer system developed at Mobile Technologies, LLC. Other types of ASR logic that may be used include speech recognizers developed by IBM Corporation, SRI, BBN, Cambridge, or Aachen. Other types of logic may be provided for other types of inputs 204 (e.g., optical character recognition logic for converting input handwriting or typing, image analysis logic for converting input photographs, etc.).

A speech recognition module 221 may recognize the user's speech, and the speech of other users that the user might interact with. The ASR logic 205 may use the speech recognition module 221 to interpret incoming speech. The speech recognition module 221 may be personalized to a user by analyzing information from, for example, videos of the user and the user's friends on the social networking service 210, calls placed through the social network's messaging service, and so forth.

When input 204 is already text, the input 204 may be provided directly to the virtual agent 202 without using the ASR logic 205. In the illustrated example, the virtual agent 202 might belong to the user 203 in the figure, or might be a virtual agent for another user.

Upon receiving the input 204, the virtual agent 202 may determine what information is needed to respond to the inquiry or perform the request, and then generate a personalized response. To determine what information is needed to respond or perform, the virtual agent 202 may search or otherwise retrieve personalization information from the social networking service, for example, from a user profile 212 and/or a social graph 214. The virtual agent 202 may, for example, retrieve calendar information, a groups list, user preference data, and so forth.

For example, a natural language understanding module 223 may take the input 204 and determine what the user is asking about, e.g. is the correct response a time, a place, a meeting request, a reservation, etc. It might use a classifier that classifies the intent of the request. That classifier might be trained on social network data.

Assuming that the virtual agent 202 can determine an intent of the input 204, the virtual agent 202 may either need more information in order to complete a response, or may have enough information and be ready to respond. When more information is needed, the virtual agent 202 may call on a dialog module 225. The dialog module 225 may guide a conversation with the user and/or with the social networking service to receive any required input that would be needed to formulate a proper response to the input 204.

The dialog module 225 may use the natural language understanding module 223 to determine what kind of information the user is looking for based on the intent. The dialog module 225 may identify what information is needed to fulfill that intent. For example, if the request is to schedule a meeting with a user, the dialog module 225 might need to know a date for the meeting, a start time, a duration, a location, and so forth. The dialog module 225 may consult different sets of rules depending on the intent to determine which information is needed.

The dialog module 225 may use a natural language generator 224 to generate queries to the user to request the information needed to fulfill the intent. For example, if a date and time are needed, the dialog module 225 may instruct the natural language generator 224 to construct a question or statement to the user 203 that asks for the date and time. The natural language generator 224 may be customized to personalize the syntax it uses based on the syntax that the user has historically used in comments and messages on the social networking site. The natural language generator 224 may phrase the queries in a way customized to the user based on the user's social network information. For one user, for example, the natural language generator 224 may phrase the question formally: "what day and time would work well for you for our meeting?". The natural language generator 224 of another user might use more informal language: "When's good for you?".

The dialog module 225 may be able to fill in some of the missing required information itself without requesting more information from the user. For example, if the user 203 asks to meet Matt for lunch, one required piece of information might be the location in which to meet. However, if the dialog module 225 can figure out based on social networking data that the user 203 and Matt are both currently close to each other, or will be close to each other at lunch time, then it might not need to ask where the lunch should occur. The social networking data used may include, for example, calendar events, location data, and/or a preferred restaurant in the location data.

Once the dialog module 225 has all the information it needs to respond to a query or act on a request, the dialog module 225 may call on the natural language generator 224 to form the responses that answer the original inquiry or request. Again, the responses may use syntax customized from the user's social networking information.

The natural language generator 224 may use a language model 222 to construct understandable sentences for output 207. The language model 222 may be customized to the user by using language training data from the user's social networking information. The customized language model 222 may, for example, use vocabulary from the user's social media content, both generated by the user, and content with which the user has interacted.

The output 207 may include requests for additional information, responses to inquiries, and/or confirmations that a requested action has taken place. If it is desirable to provide the output 207 in a format other than text, then logic may be employed for converting the output 207 into the desired format. For example, FIG. 2 depicts text-to-speech (TTS) logic 206 for converting the text received or generated by virtual agent 202 into an audio output. The TTS logic 206 generates audio output for an output device, such as a speaker. Examples of suitable TTS logic 206 include the Cepstral TTS. Other TTS modules, such as TTS modules which support Windows SAPI (speech application programming interface) conventions, could also be employed.

A voice generator 226 may be used by the TTS logic 206 to customize a voice to the user. The voice generator 226 may build a model of the user's voice based on videos, calls, audio recordings, etc. from the social networking service 210. The model could be a copy of the user's voice, or another voice customized based on user preferences, likes, etc.

Although depicted as being outside of the virtual agent 202, in an embodiment, the agent service modules 220 and/or the ASR logic 205 and TTS logic 206 may be components of a given virtual agent 202, for example, as sub-routines or objects within an executable file. In other embodiments, some or all of the agent service modules 220 may be external to the virtual agent 202, e.g. as separately executable programs or scripts, or as resource files such as libraries.

Exemplary Logic

Included herein is a set of flow charts and logic flows representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
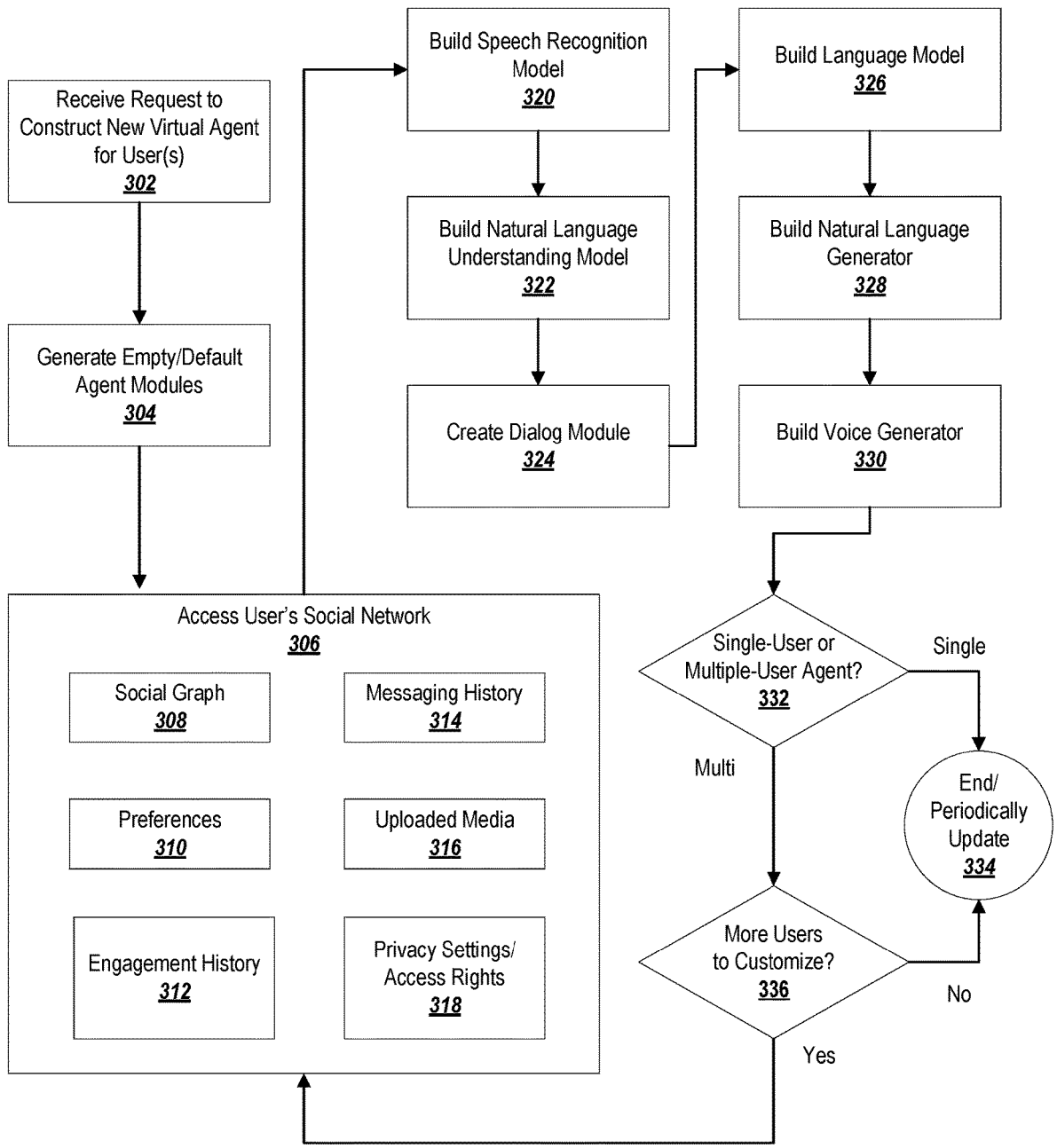
FIG. 3. is a flow chart depicting exemplary logic for personalizing a virtual agent according to exemplary embodiments.

FIG. 3 is a flow chart depicting exemplary logic 300 for performing a method for customizing a virtual agent according to exemplary embodiments. The logic flow 300 may be representative of some or all of the operations executed by one or more embodiments described herein.

In the illustrated embodiment shown in FIG. 3, the logic 300 may receive a request to construct a new virtual agent for a user at block 302. The user may, for example, select a user interface element within the operating environment 100 that begins a process for making a new virtual agent.

The logic 300 may generate empty or default agent service modules for the new agent at block 304. In an embodiment, a set of empty agent service modules, e.g. agent service modules 220, may be created for the virtual agent. An empty agent service module may comprise instructions, but no customization data, and may be initially unusable by the virtual agent until trained on social networking information. A default agent service module may include generic data and be usable by the virtual agent, but not customized to the user until trained on social networking information. In an embodiment, some of the initial agent service modules may be empty while others may be default.

The logic 300 may access the user's social network at block 306 to obtain the information used to train and/or customize the agent service modules. The logic 300 may, for example, access the social graph 308 to determine to what other users and other social network entities the user has connections, and the type of those connections.

The logic 300 may access a set of preferences 310 for the user. The set of preferences 310 may include, for example and without limitation: preferred business entities of the user such as favorite restaurants, theaters, banks, and so forth; preferred items or services at those preferred business entities; and so forth. The set of preferences 310 may also specify what kinds of actions or service the virtual agent may perform for the user or in response to other users' requests. For example, even if another user has access rights to see the user's calendar, the preferences may state that the user does not allow other users to modify the user's calendar, e.g. to schedule meetings.

The logic 300 may access an engagement history 312 for the user. The engagement history 312 may include the user's history of interacting with others within the social networking service, for example, liking posts on the social network, reacting to stories, commenting on other users' posts, and so forth. The engagement history 312 may be used to train, for example, the language model, the natural language understanding module, and/or the language generation module.

The logic 300 may access a messaging history 314 for the user to determine, for example, users and entities with which the user communicates via a messaging service. The messaging history 314 may also include the contents of the messages received by and sent from the user. The messaging history 314 may be used to train, for example, the language model, the speech recognition module, the natural language understanding module, the voice generator, and/or the natural language generator.

The logic 300 may access uploaded media 316. The uploaded media 316 may include images, videos, audio files and other content that the user has uploaded or otherwise shared to the social networking service. Videos and audio files from the user may include the user's voice or the voices of the user's social network connections. The uploaded media 316 may be used to train, for example, the voice generator and the speech recognition module.

The logic 300 may be constrained by the privacy settings 318, which may specify what components of a user's social networking information is accessible to the virtual agent and to other users.

The logic 300 may build a speech recognition module at block 320. The speech recognition module may use a generic speech recognition module initially, and may train using ASR logic 205 to recognize the user's speech, for example, from messaging history 314 and/or uploaded media 316.

The logic 300 may build a natural language understanding module at block 322. The natural language understanding module may use a generic natural language understanding module initially, and may train on the user's messaging history 314 and engagement history 312 to customize understanding of the user's natural language.

The logic 300 may create a dialog module at block 324. The dialog module may have a default set of rules for determining what information various intents need, as well as links and permissions needed to access the user's social networking information.

The logic 300 may build a language model at block 326. The language model may be customized from a generic language model in the user's primary language to the user's vocabulary, as well as speaking and writing style, for example, from the user's messaging history, engagement history, and uploaded media.

The logic 300 may build a natural language generator at block 328. The natural language generator may be customized to generate syntax and word choice from the syntax that the user has historically used in replying to posts on the social networking site, and in messaging communications as determined from the user's messaging history, engagement history, and/or uploaded media.

The logic 300 may build a voice generator at block 330. The voice generator may be built and trained directly from known audio data of the user's voice, or may be a generic voice generator that is trained to approximate to the user's voice, for example, by using pronunciation, timbre and pitch from the user's voice data, e.g. from the messaging history and uploaded media.

The logic 300 may determine whether the virtual agent is being built for a single user or for a group of users at block 332. When the virtual agent is built for a single user, the logic 300 may end at block 334. Block 334 may also include updating of an existing virtual agent. The virtual agent may be updated, for example, periodically, such as once a week, every day, once a month, etc. The virtual agent may be updated when the user's social network information changes, when a threshold amount of new social network information is added, or at the user's request.

When the virtual agent is being built for a group of users, e.g. for a family or a business, the logic flow 300 may return to block 306 and repeat the logic flow for each additional user. In an embodiment, the social networking information from the multiple users may be aggregated in building the service modules. In an embodiment, the social networking information from the multiple users may be arbitrated among the users, for example, only using information that all the users have in common, for example, when multiple users have different speaking styles, only the mannerisms that they have in common may be adopted in the language model. In an embodiment, the social networking information from the multiple users may be averaged among the users, for example, if at least half of the users in the group have a certain word in their vocabulary, the virtual agent might adopt the word. In an embodiment, different service modules may build their models differently. For example, the speech recognition model may be built by aggregating information, while the language model may be built by averaging information. The embodiments are not limited to these examples.

Figure 4A:
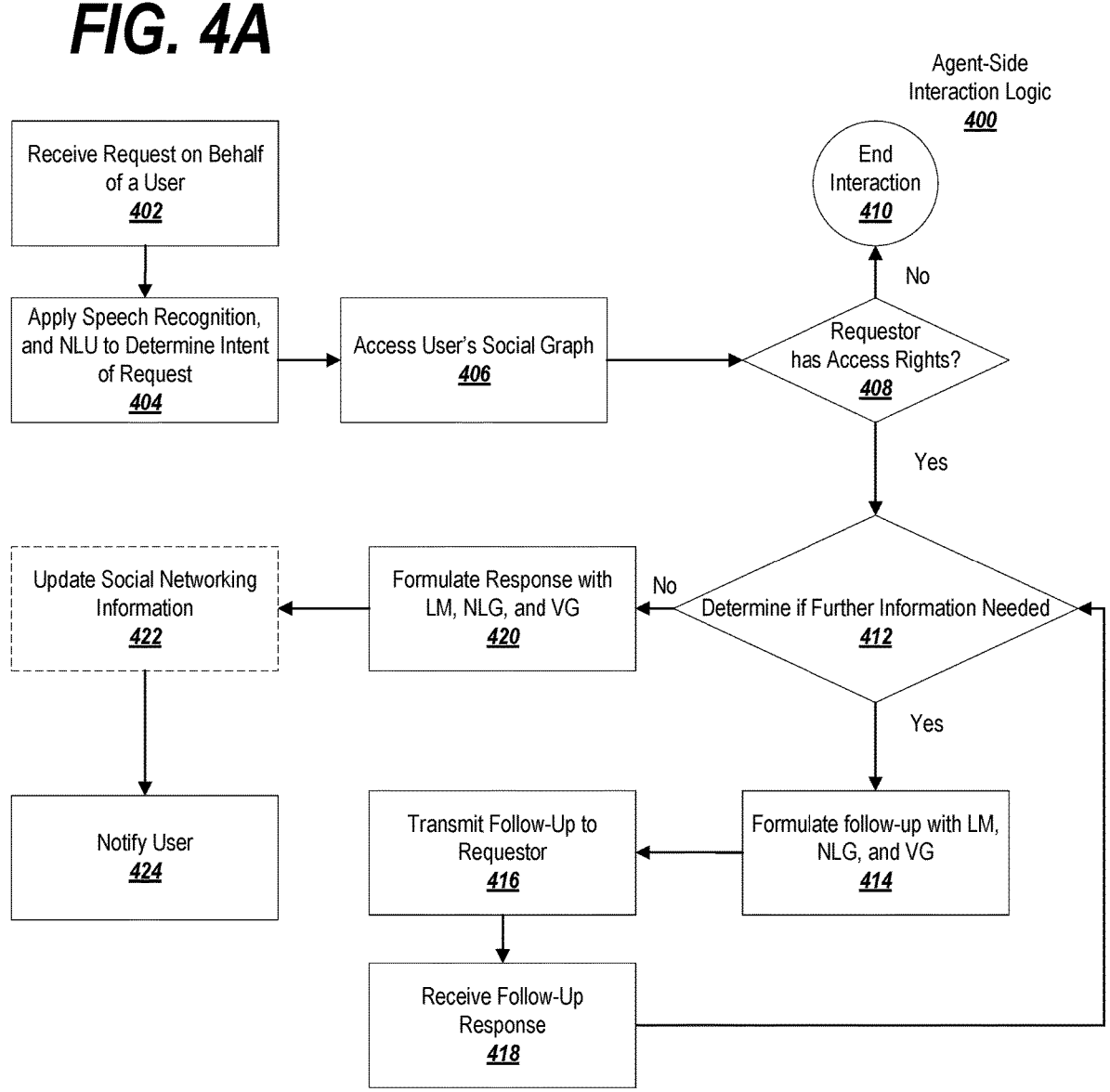
FIGS. 4A-B are flow charts depicting exemplary logic for communicating with a virtual agent according to exemplary embodiments.

FIG. 4A is a flow chart depicting exemplary logic 400 for performing a method for interacting with a virtual agent according to exemplary embodiments. The logic flow 400 may be representative of some or all of the operations executed by one or more embodiments described herein. The logic flow 400 may represent the perspective of a virtual agent that receives a request either from its own user or from another user or user's virtual agent within the environment. The virtual agent may reside on the social networking service, on a client device of the receiving user ("the requestee"), or on a third-party system.

In the illustrated embodiment shown in FIG. 4A, the logic 400 may receive a request on behalf of a user ("the requestor") at block 402. For example, the virtual agent 202 may receive input 203. The requestor may be the user associated with the receiving virtual agent, in which case the requestor and the requestee may be the same user. The requestor may be a user not associated with the receiving virtual agent, or another virtual agent associated with a different user. The received request may be, for example, a request to perform an action, or a request for information.

The logic 400 may apply speech recognition and natural language understanding to determine the intent of the request at bock 404. If the request is received as audio data, the virtual agent may use ASR logic 205 and speech recognition module 221 to convert the request to text. Once in text form, the virtual agent may use the dialog module 225 and the natural language understanding module 223 to determine an intent of the request.

The logic 400 may access a user's social graph at block 406. The virtual agent may access the requestee's social graph in order to determine whether the requestor has access rights to the requestee's information at block 408. More specifically, the logic flow 400 may determine whether the requestor has access rights to the information from the requestee's social graph that would be needed to fulfill the request. The virtual agent may check the requestee's privacy settings, which may specify whether the requestor can see the needed information. The virtual agent may check preferences, which may specify whether a particular action can be taken for this requestor, regardless of whether the requestor may see the information. In cases where the requestor and the requestee are the same user, block 408 may be skipped.

The logic 400 may end the interaction at block 410 when the requestor does not have access rights.

The logic flow 400 may determine if further information is needed at block 412 when the requestor does have the appropriate access rights. For example, the virtual agent may consult the dialog module 225 to determine, based on the intent, if more information is needed.

The logic flow 400 may formulate a follow-up query or request at block 414 when further information is needed. The dialog module 225 may use the natural language generator 224 to generate a follow-up query or request for more information.

The logic flow 400 may transmit the follow-up to the requestor at block 416.

The logic flow 400 may receive a follow-up response at block 418. In some cases, the follow-up response may first need to be converted to text from speech. The logic flow 400 may return to block 412.

The logic flow 400 may formulate a response at block 420 when no further information is needed. Formulating the response may comprise looking up information in the requestee's social networking information and generating a response with the natural language generator 224. Formulating a response may require one or more actions to be taken, such as creating a meeting event, making a reservation, ordering a product or service, making a payment, downloading a file, and so forth. Once the action(s) is taken, the textual response may be generated that confirms that the action was taken, describes the actions taken, or otherwise concludes the interaction between the requestor and requestee with respect to the initial request.

In some cases, the formulated response may be converted from text into speech, for example, with the voice generation module 226 and the TTS logic 206.

The logic flow 400 may, optionally, update social networking information for the requestee at block 422. For example, if the requestee accepts an invitation to an event represented within the social network, the response or action taken from the request can be represented as a change to the requestee's social graph. Other actions or responses may not affect social networking information, for example, if the requestee orders a meal from a restaurant.

The logic flow 400 may notify the requestee and/or the requestor at block 424. The requestee may be notified if a change is made to their social networking information, e.g. "you accepted Tom's invitation to the party event". The requestor may be notified of the result of the request or inquiry, for example, "Anne accepted your invitation to the party event". The notifications may be text or audio output responses generated by the natural language generator and the voice generator.

Figure 4B:
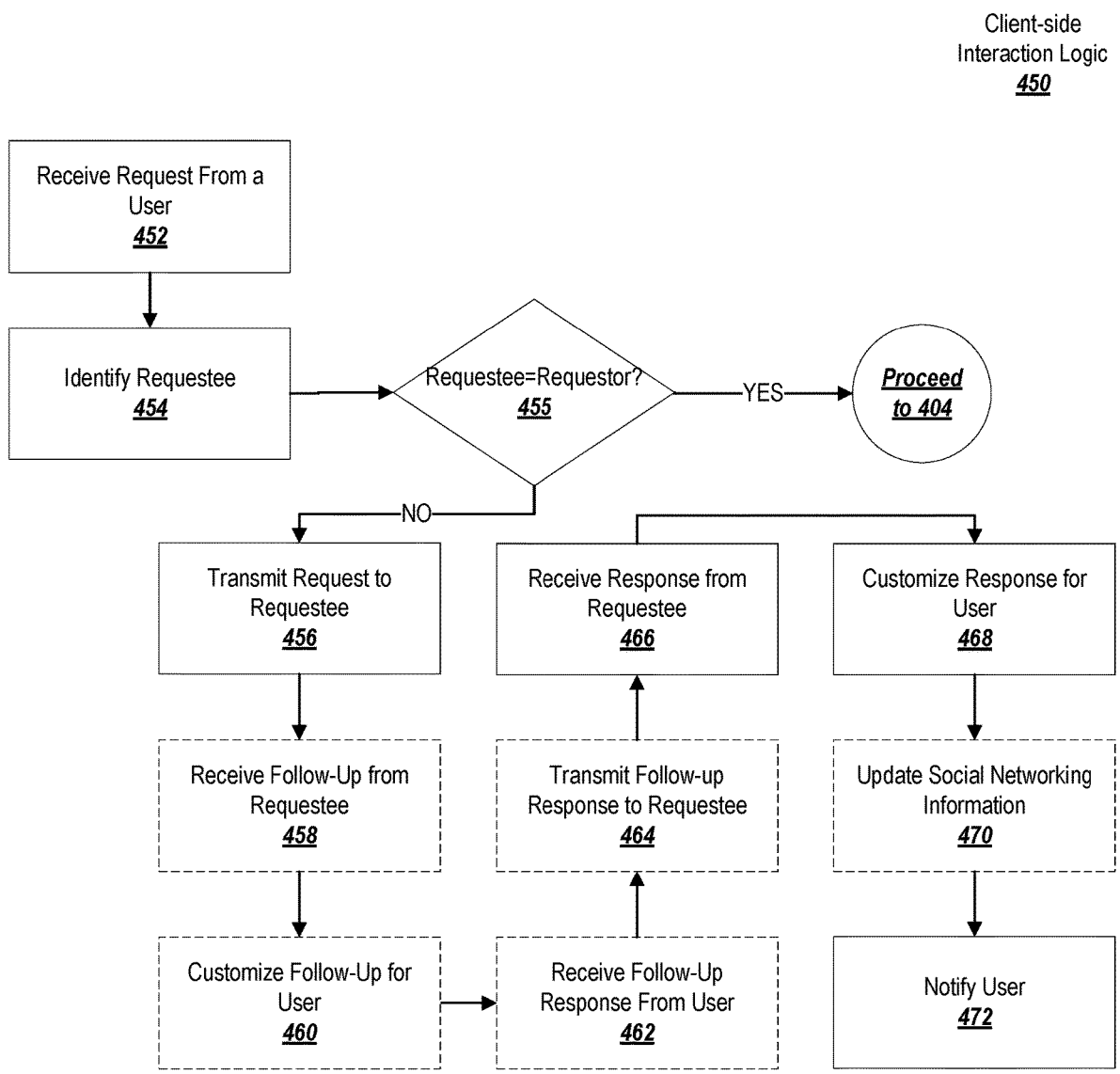

FIG. 4B is a flow chart depicting exemplary logic 450 for performing a method for submitting an inquiry or request to a virtual agent according to exemplary embodiments. The logic flow 450 may represent the perspective of a virtual agent that receives a request from its own user. The virtual agent may reside on the social networking service, on a client device of the requesting user ("the requestor"), or on a third-party system.

In the illustrated embodiment shown in FIG. 4, the logic 450 may receive a request from a user at block 452. For example, a virtual agent for a user may receive a request or inquiry directed to the virtual agent from its user.

The logic 450 may identify the recipient user at block 554. For example, the virtual agent may determine if the request involves another user ("the requestee"). The request may include a delivery address such as a mobile telephone number, an email address, a network address, a chat handle, a social network user identifier, a virtual agent identifier, and so forth. Requests directed at other users may include, for example and without limitation, calendar-related requests (for meetings, social engagements, appointments, and so forth), or requests about personal information (birthday, favorites, address, and so forth). Some requests may not involve another user and may be more directed to the virtual agent itself. Such requests may include, for example, and without limitation, requests to purchase an item, make a reservation, or look up information. For the purpose of discussion, requests directed to the virtual agent of the requesting user are said to be directed to the requestor.

The logic 450 may determine if the requestee is the same user as the requestor at block 455. When the requestee is the requestor, the logic flow 450 may proceed to the logic flow 400 at block 404. That is, when the request is directed to the requestor's virtual agent and does not involve another user or another user's virtual agent, the flow may proceed as described above with respect to FIG. 4A starting at block 404.

When the requestee is not the requestor, i.e. when the request is directed to another user (or to a virtual agent of another user), the logic flow 450 may transmit the request to the requestee at block 456. The request may be forwarded to the delivery address in the request. In some cases, a non-textual request may first be converted into text before sending to the requestee, particularly, if the delivery address is for a text-based communication channel.

The logic flow 450 may optionally receive a follow-up request from the requestee at block 458. If the requestee's virtual agent needs more information to complete the request, it may, as described in FIG. 4A, request the missing information in a follow-up request.

The logic flow 450 may optionally customize the follow-up for the user at block 460. For example, if the follow-up request list the missing items of information, the virtual agent may use the natural language generator and language model to convert the list into a natural language statement that may use the requestor's vocabulary. The follow-up request may be converted to speech by the voice generator, e.g. using the requestor's voice.

The logic flow 4540 may receive a follow-up response from the user at block 462. The requestor may provide a response to the follow-up in the same manner as the original request, or in a different format.

The logic flow 450 may transmit the follow-up response to the requestee at block 464.

The logic flow 450 may receive a response from the requestee at block 466. The response may be a confirmation that an action was taken, information received from the requestee, or some other indication that the request or inquiry was acted on and completed.

The logic flow 450 may optionally customize the response for the user at block 468. The response may be written or rewritten by the natural language generator, which may use the language model for the requestor. The voice generation module may be used to convert text into speech modeled from the requestor's voice, or from the voice of the requestee.

The logic flow 450 may optionally update the user's social networking information at block 470, as described above with respect to FIG. 4A.

The logic flow 450 may notify the user at block 472. Notifying the user may include outputting the response to the requestor on the requestor's client device, e.g. in a text message on the display, as a message in the requestor's inbox in a messaging system, or playing an audio message on a speaker.

Communication System Overview

Figure 5B:
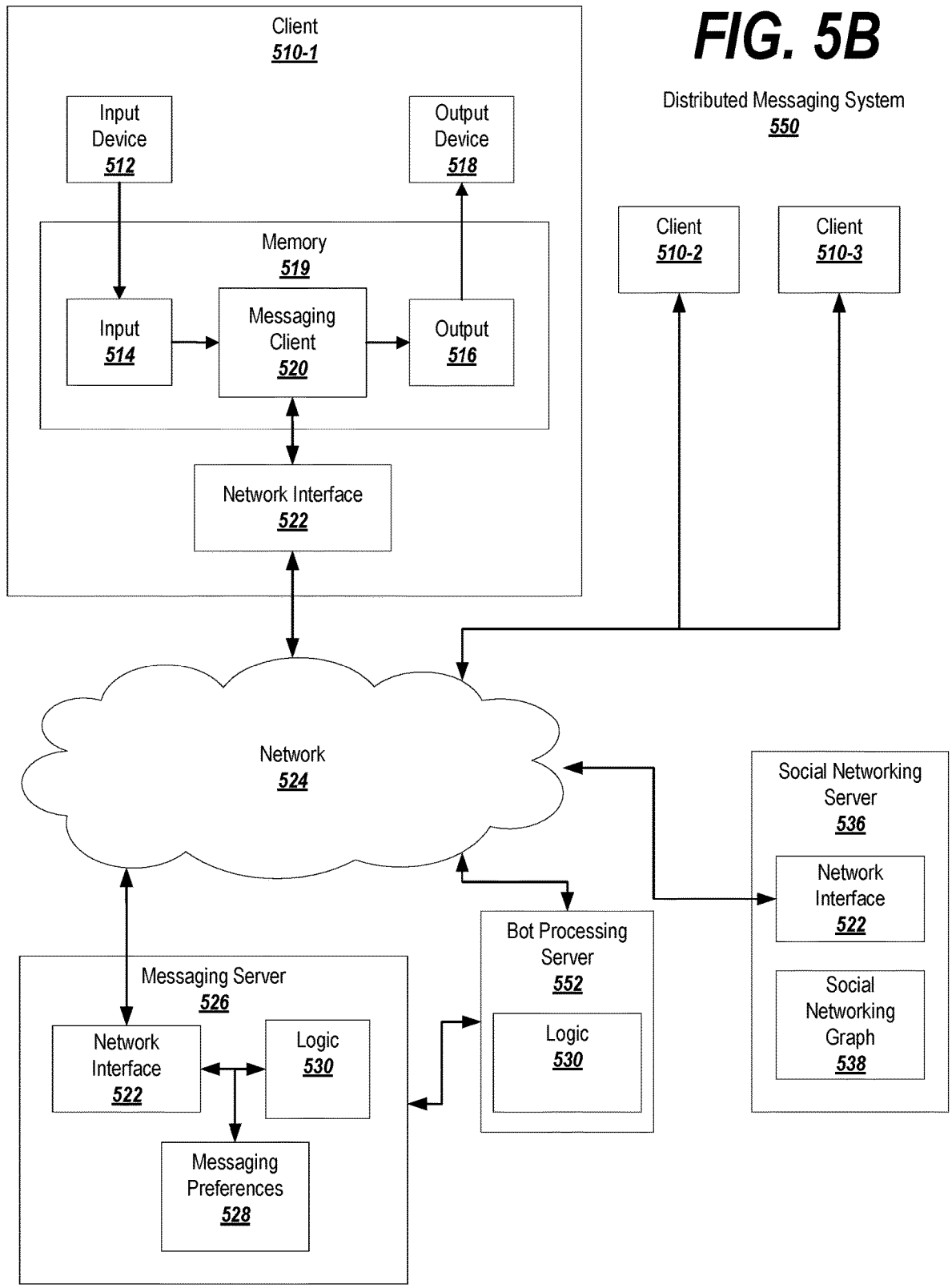
FIG. 5B is a block diagram providing an overview of a system including an exemplary distributed communications service.
Figure 5C:
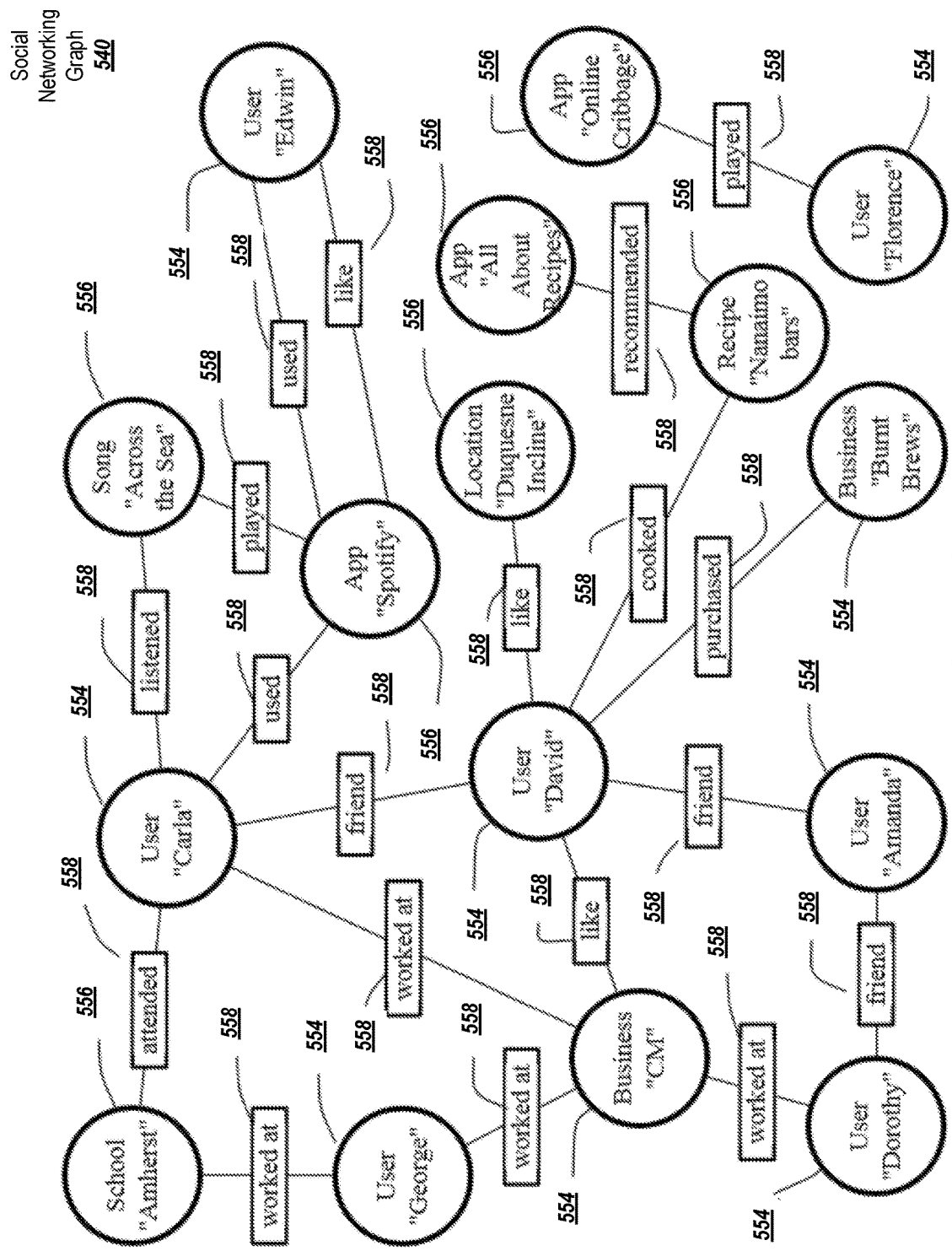
FIG. 5C depicts the social networking graph of FIGS. 5A-5B in more detail.

These examples may be implemented by a communications system that is provided either locally, at a client device, or remotely (e.g., at a remote server). FIGS. 5A-5C depict various examples of communications systems, and are discussed in more detail below.

FIG. 5A depicts an exemplary centralized communication system 500, in which functionality such as that descried above is integrated into a communication server. The centralized system 500 may implement some or all of the structure and/or operations of a communication service in a single computing entity, such as entirely within a single centralized server device 526.

The communication system 500 may include a computer-implemented system having software applications that include one or more components. Although the communication system 500 shown in FIG. 5A has a limited number of elements in a certain topology, the communication system 500 may include more or fewer elements in alternate topologies.

A communication service 500 may be generally arranged to receive, store, and deliver messages. The communication service 500 may store messages while clients 520, such as may execute on client devices 510, are offline and deliver the messages once the messaging clients are available. Alternatively or in addition, the clients 520 may include social networking functionality.

A client device 510 may transmit messages addressed to a recipient user, user account, or other identifier resolving to a receiving client device 510. In exemplary embodiments, each of the client devices 510 and their respective messaging clients 520 are associated with a particular user or users of the communication service 500. In some embodiments, the client devices 510 may be cellular devices such as smartphones and may be identified to the communication service 500 based on a phone number associated with each of the client devices 510. In some embodiments, each messaging client may be associated with a user account registered with the communication service 500. In general, each messaging client may be addressed through various techniques for the reception of messages. While in some embodiments the client devices 510 may be cellular devices, in other embodiments one or more of the client devices 510 may be personal computers, tablet devices, any other form of computing device.

The client 510 may include on his e or more input devices 512 and one or more output devices 518. The input devices 512 may include, for example, microphones, keyboards, cameras, electronic pens, touch screens, and other devices for receiving inputs including message data, requests, commands, user interface interactions, selections, and other types of input. The output devices 518 may include a speaker, a display device such as a monitor or touch screen, and other devices for presenting an interface to the communication system 500.

The client 510 may include a memory 519, which may be a non-transitory computer readable storage medium, such as one or a combination of a hard drive, solid state drive, flash storage, read only memory, or random access memory. The memory 519 may a representation of an input 514 and/or a representation of an output 516, as well as one or more applications. For example, the memory 519 may store a messaging client 520 and/or a social networking client that allows a user to interact with a social networking service.

The input 514 may be textual, such as in the case where the input device 212 is a keyboard. Alternatively, the input 514 may be an audio recording, such as in the case where the input device 512 is a microphone. Accordingly, the input 514 may be subjected to automatic speech recognition (ASR) logic in order to transform the audio recording to text that is processable by the communication system 500. The ASR logic may be located at the client device 510 (so that the audio recording is processed locally by the client 510 and corresponding text is transmitted to the messaging server 526), or may be located remotely at the messaging server 526 (in which case, the audio recording may be transmitted to the messaging server 526 and the messaging server 526 may process the audio into text). Other combinations are also possible—for example, if the input device 512 is a touch pad or electronic pen, the input 514 may be in the form of handwriting, which may be subjected to handwriting or optical character recognition analysis logic in order to transform the input 512 into proces sable text.

The client 510 may be provided with a network interface 522 for communicating with a network 524, such as the Internet. The network interface 522 may transmit the input 512 in a format and/or using a protocol compatible with the network 524 and may receive a corresponding output 516 from the network 524.

The network interface 522 may communicate through the network 524 to a messaging server 526. The messaging server 526 may be operative to receive, store, and forward messages between messaging clients.

The messaging server 526 may include a network interface 522, messaging preferences 528, and communications logic 530. The messaging preferences 528 may include one or more privacy settings or other preferences for one or more users and/or message threads. Furthermore, the messaging preferences 528 may include one or more settings, including default settings, for the logic described herein.

The communications logic 530 may include logic for implementing any or all of the above-described features of the present invention. Alternatively or in addition, some or all of the features may be implemented at the client 510-$i$, such as by being incorporated into an application such as the messaging client 520.

The network interface 522 of the client 510 and/or the messaging server 526 may also be used to communicate through the network 524 with an app server 540. The app server may store software or applications in an app library 544, representing software available for download by the client 510-$i$ and/or the messaging server 526 (among other entities). An app in the app library 544 may fully or partially implement the embodiments described herein. Upon receiving a request to download software incorporating exemplary embodiments, app logic 542 may identify a corresponding app in the app library 544 and may provide (e.g., via a network interface) the app to the entity that requested the software.

The network interface 522 of the client 510 and/or the messaging server 526 may also be used to communicate through the network 524 with a social networking server 536. The social networking server 536 may include or may interact with a social networking graph 538 that defines connections in a social network. Furthermore, the messaging server 526 may connect to the social networking server 536 for various purposes, such as retrieving connection information, messaging history, event details, etc. from the social network.

A user of the client 510 may be an individual (human user), an entity (e.g., an enterprise, business, or third-party application), or a group (e.g., of individuals or entities) that interacts or communicates with or over the social networking server 536. The social-networking server 536 may be a network-addressable computing system hosting an online social network. The social networking server 536 may generate, store, receive, and send social-networking data, such as, for example, user-profile data, concept-profile data, social-graph information, or other suitable data related to the online social network. The social networking server 536 may be accessed by the other components of the network environment either directly or via the network 524.

The social networking server 536 may include an authorization server (or other suitable component(s)) that allows users to opt in to or opt out of having their actions logged by social-networking server 536 or shared with other systems (e.g., third-party systems, such as the messaging server 526), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking server 536 through blocking, data hashing, anonymization, or other suitable techniques as appropriate.

More specifically, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums).

In particular embodiments, privacy settings may be associated with particular elements of the social networking graph 538. Privacy settings of a social-graph element, such as a node or an edge, may specify how the social-graph element, information associated with the social-graph element, or content objects associated with the social-graph element can be accessed using the online social network. As an example and not by way of limitation, a particular concept node corresponding to a particular photo may have a privacy setting specifying that the photo may only be accessed by users tagged in the photo and their friends. In particular embodiments, privacy settings may allow users to opt in or opt out of having their actions logged by social networking server 536 or shared with other systems. In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In response to a request from a user (or other entity) for a particular object stored in a data store, the social networking server 536 may send a request to the data store for the object. The request may identify the user associated with the request. The requested data object may only be sent to the user (or a client system 510 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results.

In some embodiments, targeting criteria may be used to identify users of the social network for various purposes. Targeting criteria used to identify and target users may include explicit, stated user interests on social-networking server 536 or explicit connections of a user to a node, object, entity, brand, or page on social networking server 536. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for COCA-COLA?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also implicate privacy settings (such as user opt-outs), data hashing, or data anonymization, as appropriate.

The centralized embodiment depicted in FIG. 5A may be well-suited to deployment as a new system or as an upgrade to an existing system, because the logic for implementing exemplary embodiments is incorporated into the messaging server 526. In contrast, FIG. 5B depicts an exemplary distributed messaging system 550, in which functionality for implementing exemplary embodiments is distributed and remotely accessible from the messaging server. Examples of a distributed system 550 include a client-server architecture, a 3-tier architecture, an N-tier architecture, a tightly-coupled or clustered architecture, a peer-to-peer architecture, a master-slave architecture, a shared database architecture, and other types of distributed systems.

Many of the components depicted in FIG. 5B are identical to those in FIG. 5A, and a description of these elements is not repeated here for the sake of brevity (the app server 540 is omitted from the Figure for ease of discussion, although it is understood that this embodiment may also employ an app server 540). The primary difference between the centralized embodiment and the distributed embodiment is the addition of a separate bot processing server 552, which hosts the logic 530 for implementing exemplary embodiments. The bot processing server 552 may be distinct from the messaging server 526 but may communicate with the messaging server 526, either directly or through the network 524, to provide the functionality of the logic 530 and the logic 534 to the messaging server 526.

The embodiment depicted in FIG. 5B may be particularly well suited to allow exemplary embodiments to be deployed alongside existing messaging systems, for example when it is difficult or undesirable to replace an existing messaging server. Additionally, in some cases the messaging server 526 may have limited resources (e.g. processing or memory resources) that limit or preclude the addition of the additional pivot functionality. In such situations, the capabilities described herein may still be provided through the separate bot processing server 552.

In still further embodiments, the logic 532 may be provided locally at the client 510-i, for example as part of the messaging client 520. In these embodiments, each client 510-i makes its own determination as to which messages belong to which thread, and how to update the display and issue notifications. As a result, different clients 510-i may display the same conversation differently, depending on local settings (for example, the same messages may be assigned to different threads, or similar threads may have different parents or highlights).

FIG. 5C illustrates an example of a social networking graph 538. In exemplary embodiments, a social networking service may store one or more social graphs 538 in one or more data stores as a social graph data structure via the social networking service.

The social graph 538 may include multiple nodes, such as user nodes 554 and concept nodes 556. The social graph 228 may furthermore include edges 558 connecting the nodes. The nodes and edges of social graph 228 may be stored as data objects, for example, in a data store (such as a social-graph database). Such a data store may include one or more searchable or queryable indexes of nodes or edges of social graph 228.

The social graph 538 may be accessed by a social-networking server 226, client system 210, third-party system (e.g., the translation server 224), or any other approved system or device for suitable applications.

A user node 554 may correspond to a user of the social-networking system. A user may be an individual (human user), an entity (e.g., an enterprise, business, or third-party application), or a group (e.g., of individuals or entities) that interacts or communicates with or over the social-networking system. In exemplary embodiments, when a user registers for an account with the social-networking system, the social-networking system may create a user node 554 corresponding to the user, and store the user node 30 in one or more data stores. Users and user nodes 554 described herein may, where appropriate, refer to registered users and user nodes 554 associated with registered users. In addition or as an alternative, users and user nodes 554 described herein may, where appropriate, refer to users that have not registered with the social-networking system. In particular embodiments, a user node 554 may be associated with information provided by a user or information gathered by various systems, including the social-networking system. As an example and not by way of limitation, a user may provide their name, profile picture, contact information, birth date, sex, marital status, family status, employment, education background, preferences, interests, or other demographic information. In particular embodiments, a user node 554 may be associated with one or more data objects corresponding to information associated with a user. In particular embodiments, a user node 554 may correspond to one or more webpages. A user node 554 may be associated with a unique user identifier for the user in the social-networking system.

In particular embodiments, a concept node 556 may correspond to a concept. As an example and not by way of limitation, a concept may correspond to a place (such as, for example, a movie theater, restaurant, landmark, or city); a website (such as, for example, a website associated with the social-network service or a third-party website associated with a web-application server); an entity (such as, for example, a person, business, group, sports team, or celebrity); a resource (such as, for example, an audio file, video file, digital photo, text file, structured document, or application) which may be located within the social-networking system or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 556 may be associated with information of a concept provided by a user or information gathered by various systems, including the social-networking system. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 556 may be associated with one or more data objects corresponding to information associated with concept node 556. In particular embodiments, a concept node 556 may correspond to one or more webpages.

In particular embodiments, a node in social graph 538 may represent or be represented by a webpage (which may be referred to as a "profile page"). Profile pages may be hosted by or accessible to the social-networking system. Profile pages may also be hosted on third-party websites associated with a third-party server. As an example and not by way of limitation, a profile page corresponding to a particular external webpage may be the particular external webpage and the profile page may correspond to a particular concept node 556. Profile pages may be viewable by all or a selected subset of other users. As an example and not by way of limitation, a user node 554 may have a corresponding user-profile page in which the corresponding user may add content, make declarations, or otherwise express himself or herself. A business page such as business page 205 may comprise a user-profile page for a commerce entity. As another example and not by way of limitation, a concept node 556 may have a corresponding concept-profile page in which one or more users may add content, make declarations, or express themselves, particularly in relation to the concept corresponding to concept node 556.

In particular embodiments, a concept node 556 may represent a third-party webpage or resource hosted by a third-party system. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system to send to the social-networking system a message indicating the user's action. In response to the message, the social-networking system may create an edge (e.g., an "eat" edge) between a user node 554 corresponding to the user and a concept node 556 corresponding to the third-party webpage or resource and store edge 558 in one or more data stores.

In particular embodiments, a pair of nodes in social graph 538 may be connected to each other by one or more edges 558. An edge 558 connecting a pair of nodes may represent a relationship between the pair of nodes. In particular embodiments, an edge 558 may include or represent one or more data objects or attributes corresponding to the relationship between a pair of nodes. As an example and not by way of limitation, a first user may indicate that a second user is a "friend" of the first user. In response to this indication, the social-networking system may send a "friend request" to the second user. If the second user confirms the "friend request," the social-networking system may create an edge 558 connecting the first user's user node 554 to the second user's user node 554 in social graph 538 and store edge 558 as social-graph information in one or more data stores. In the example of FIG. 5C, social graph 538 includes an edge 558 indicating a friend relation between user nodes 554 of user "Amanda" and user "Dorothy." Although this disclosure describes or illustrates particular edges 558 with particular attributes connecting particular user nodes 554, this disclosure contemplates any suitable edges 558 with any suitable attributes connecting user nodes 554. As an example and not by way of limitation, an edge 558 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 538 by one or more edges 558.

In particular embodiments, an edge 558 between a user node 554 and a concept node 556 may represent a particular action or activity performed by a user associated with user node 554 toward a concept associated with a concept node 556. As an example and not by way of limitation, as illustrated in FIG. 5C, a user may "like," "attended," "played," "listened," "cooked," "worked at," or "watched" a concept, each of which may correspond to a edge type or subtype. A concept-profile page corresponding to a concept node 556 may include, for example, a selectable "check in" icon (such as, for example, a clickable "check in" icon) or a selectable "add to favorites" icon. Similarly, after a user clicks these icons, the social-networking system may create a "favorite" edge or a "check in" edge in response to a user's action corresponding to a respective action. As another example and not by way of limitation, a user (user "Carla") may listen to a particular song ("Across the Sea") using a particular application (SPOTTY, which is an online music application). In this case, the social-networking system may create a "listened" edge 558 and a "used" edge (as illustrated in FIG. 5C) between user nodes 554 corresponding to the user and concept nodes 556 corresponding to the song and application to indicate that the user listened to the song and used the application. Moreover, the social-networking system may create a "played" edge 558 (as illustrated in FIG. 5C) between concept nodes 556 corresponding to the song and the application to indicate that the particular song was played by the particular application. In this case, "played" edge 558 corresponds to an action performed by an external application (SPOTIFY) on an external audio file (the song "Across the Sea"). Although this disclosure describes particular edges 558 with particular attributes connecting user nodes 554 and concept nodes 556, this disclosure contemplates any suitable edges 558 with any suitable attributes connecting user nodes 554 and concept nodes 556. Moreover, although this disclosure describes edges between a user node 554 and a concept node 556 representing a single relationship, this disclosure contemplates edges between a user node 554 and a concept node 556 representing one or more relationships. As an example and not by way of limitation, an edge 558 may represent both that a user likes and has used at a particular concept. Alternatively, another edge 558 may represent each type of relationship (or multiples of a single relationship) between a user node 554 and a concept node 556 (as illustrated in FIG. 5C between user node 554 for user "Edwin" and concept node 556 for "SPOTIFY").

In particular embodiments, the social-networking system may create an edge 558 between a user node 554 and a concept node 556 in social graph 538. As an example and not by way of limitation, a user viewing a concept-profile page (such as, for example, by using a web browser or a special-purpose application hosted by the user's client system) may indicate that he or she likes the concept represented by the concept node 556 by clicking or selecting a "Like" icon, which may cause the user's client system to send to the social-networking system a message indicating the user's liking of the concept associated with the concept-profile page. In response to the message, the social-networking system may create an edge 558 between user node 554 associated with the user and concept node 556, as illustrated by "like" edge 558 between the user and concept node 556. In particular embodiments, the social-networking system may store an edge 558 in one or more data stores. In particular embodiments, an edge 558 may be automatically formed by the social-networking system in response to a particular user action. As an example and not by way of limitation, if a first user uploads a picture, watches a movie, or listens to a song, an edge 558 may be formed between user node 554 corresponding to the first user and concept nodes 556 corresponding to those concepts. Although this disclosure describes forming particular edges 558 in particular manners, this disclosure contemplates forming any suitable edges 558 in any suitable manner.

The social graph 538 may further comprise a plurality of product nodes. Product nodes may represent particular products that may be associated with a particular business. A business may provide a product catalog to a consumer-to-business service and the consumer-to-business service may therefore represent each of the products within the product in the social graph 538 with each product being in a distinct product node. A product node may comprise information relating to the product, such as pricing information, descriptive information, manufacturer information, availability information, and other relevant information. For example, each of the items on a menu for a restaurant may be represented within the social graph 538 with a product node describing each of the items. A product node may be linked by an edge to the business providing the product. Where multiple businesses provide a product, each business may have a distinct product node associated with its providing of the product or may each link to the same product node. A product node may be linked by an edge to each user that has purchased, rated, owns, recommended, or viewed the product, with the edge describing the nature of the relationship (e.g., purchased, rated, owns, recommended, viewed, or other relationship). Each of the product nodes may be associated with a graph id and an associated merchant id by virtue of the linked merchant business. Products available from a business may therefore be communicated to a user by retrieving the available product nodes linked to the user node for the business within the social graph 538. The information for a product node may be manipulated by the social-networking system as a product object that encapsulates information regarding the referenced product.

As such, the social graph 538 may be used to infer shared interests, shared experiences, or other shared or common attributes of two or more users of a social-networking system. For instance, two or more users each having an edge to a common business, product, media item, institution, or other entity represented in the social graph 538 may indicate a shared relationship with that entity, which may be used to suggest customization of a use of a social-networking system, including a messaging system, for one or more users.

The embodiments described above may be performed by a messaging architecture, an example of which is next described with reference to FIG. 6.

Messaging Architecture

Figure 6:
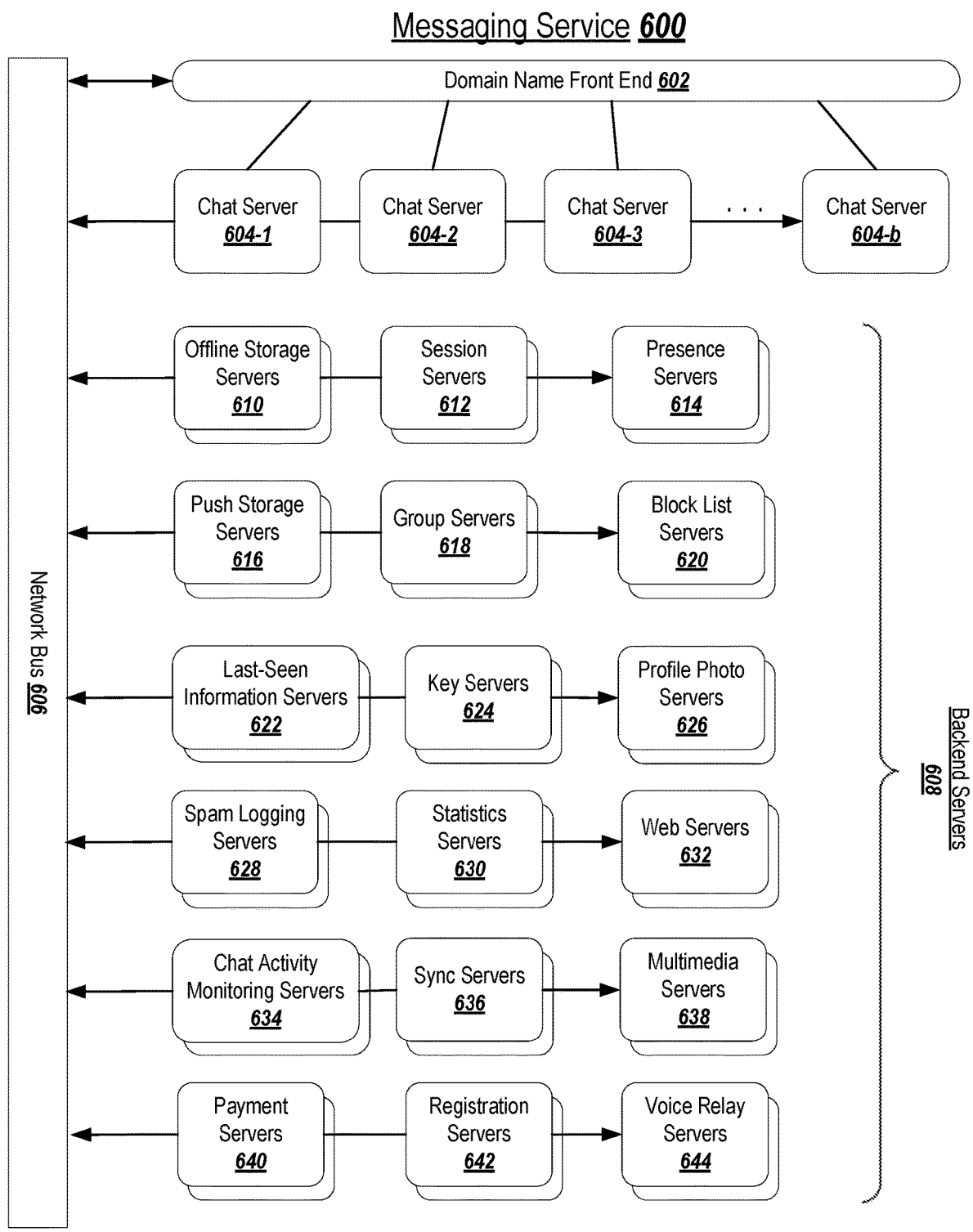
FIG. 6 is a block diagram depicting an example of a system for a messaging service.

FIG. 6 illustrates an embodiment of a plurality of servers implementing various functions of a messaging service 600. It will be appreciated that different distributions of work and functions may be used in various embodiments of a messaging service 600.

The messaging service 600 may comprise a domain name front end 602. The domain name front end 602 may be assigned one or more domain names associated with the messaging service 600 in a domain name system (DNS). The domain name front end 602 may receive incoming connections and distribute the connections to servers providing various messaging services.

The messaging service 602 may comprise one or more chat servers 604. The chat servers 604 may comprise front-end servers for receiving and transmitting user-to-user messaging updates such as chat messages. Incoming connections may be assigned to the chat servers 604 by the domain name front end 602 based on workload balancing.

The messaging service 600 may comprise backend servers 608. The backend servers 608 may perform specialized tasks in the support of the chat operations of the front-end chat servers 604. A plurality of different types of backend servers 608 may be used. It will be appreciated that the assignment of types of tasks to different backend serves 608 may vary in different embodiments. In some embodiments some of the back-end services provided by dedicated servers may be combined onto a single server or a set of servers each performing multiple tasks divided between different servers in the embodiment described herein. Similarly, in some embodiments tasks of some of dedicated back-end servers described herein may be divided between different servers of different server groups.

The messaging service 600 may comprise one or more offline storage servers 610. The one or more offline storage servers 610 may store messaging content for currently-offline messaging clients in hold for when the messaging clients reconnect.

The messaging service 600 may comprise one or more sessions servers 612. The one or more session servers 612 may maintain session state of connected messaging clients.

The messaging service 600 may comprise one or more presence servers 614. The one or more presence servers 614 may maintain presence information for the messaging service 600. Presence information may correspond to user-specific information indicating whether or not a given user has an online messaging client and is available for chatting, has an online messaging client but is currently away from it, does not have an online messaging client, and any other presence state.

The messaging service 600 may comprise one or more push storage servers 616. The one or more push storage servers 616 may cache push requests and transmit the push requests to messaging clients. Push requests may be used to wake messaging clients, to notify messaging clients that a messaging update is available, and to otherwise perform server-side-driven interactions with messaging clients.

The messaging service 600 may comprise one or more group servers 618. The one or more group servers 618 may maintain lists of groups, add users to groups, remove users from groups, and perform the reception, caching, and forwarding of group chat messages.

The messaging service 600 may comprise one or more block list servers 620. The one or more block list servers 620 may maintain user-specific block lists, the user-specific incoming-block lists indicating for each user the one or more other users that are forbidden from transmitting messages to that user. Alternatively or additionally, the one or more block list servers 620 may maintain user-specific outgoing-block lists indicating for each user the one or more other users that that user is forbidden from transmitting messages to. It will be appreciated that incoming-block lists and outgoing-block lists may be stored in combination in, for example, a database, with the incoming-block lists and outgoing-block lists representing different views of a same repository of block information.

The messaging service 600 may comprise one or more last seen information servers 622. The one or more last seen information servers 622 may receive, store, and maintain information indicating the last seen location, status, messaging client, and other elements of a user's last seen connection to the messaging service 600.

The messaging service 600 may comprise one or more key servers 624. The one or more key servers may host public keys for public/private key encrypted communication.

The messaging service 600 may comprise one or more profile photo servers 626. The one or more profile photo servers 626 may store and make available for retrieval profile photos for the plurality of users of the messaging service 600.

The messaging service 600 may comprise one or more spam logging servers 628. The one or more spam logging servers 628 may log known and suspected spam (e.g., unwanted messages, particularly those of a promotional nature). The one or more spam logging servers 628 may be operative to analyze messages to determine whether they are spam and to perform punitive measures, in some embodiments, against suspected spammers (users that send spam messages).

The messaging service 600 may comprise one or more statistics servers 630. The one or more statistics servers may compile and store statistics information related to the operation of the messaging service 600 and the behavior of the users of the messaging service 600.

The messaging service 600 may comprise one or more web servers 632. The one or more web servers 632 may engage in hypertext transport protocol (HTTP) and hypertext transport protocol secure (HTTPS) connections with web browsers.

The messaging service 600 may comprise one or more chat activity monitoring servers 634. The one or more chat activity monitoring servers 634 may monitor the chats of users to determine unauthorized or discouraged behavior by the users of the messaging service 600. The one or more chat activity monitoring servers 634 may work in cooperation with the spam logging servers 628 and block list servers 620, with the one or more chat activity monitoring servers 634 identifying spam or other discouraged behavior and providing spam information to the spam logging servers 628 and blocking information, where appropriate to the block list servers 620.

The messaging service 600 may comprise one or more sync servers 636. The one or more sync servers 636 may sync the messaging system 500 with contact information from a messaging client, such as an address book on a mobile phone, to determine contacts for a user in the messaging service 600.

The messaging service 600 may comprise one or more multimedia servers 638. The one or more multimedia servers may store multimedia (e.g., images, video, audio) in transit between messaging clients, multimedia cached for offline endpoints, and may perform transcoding of multimedia.

The messaging service 600 may comprise one or more payment servers 640. The one or more payment servers 640 may process payments from users. The one or more payment servers 640 may connect to external third-party servers for the performance of payments.

The messaging service 600 may comprise one or more registration servers 642. The one or more registration servers 642 may register new users of the messaging service 600.

The messaging service 600 may comprise one or more voice relay servers 644. The one or more voice relay servers 644 may relay voice-over-internet-protocol (VoIP) voice communication between messaging clients for the performance of VoIP calls.

Figure 7:
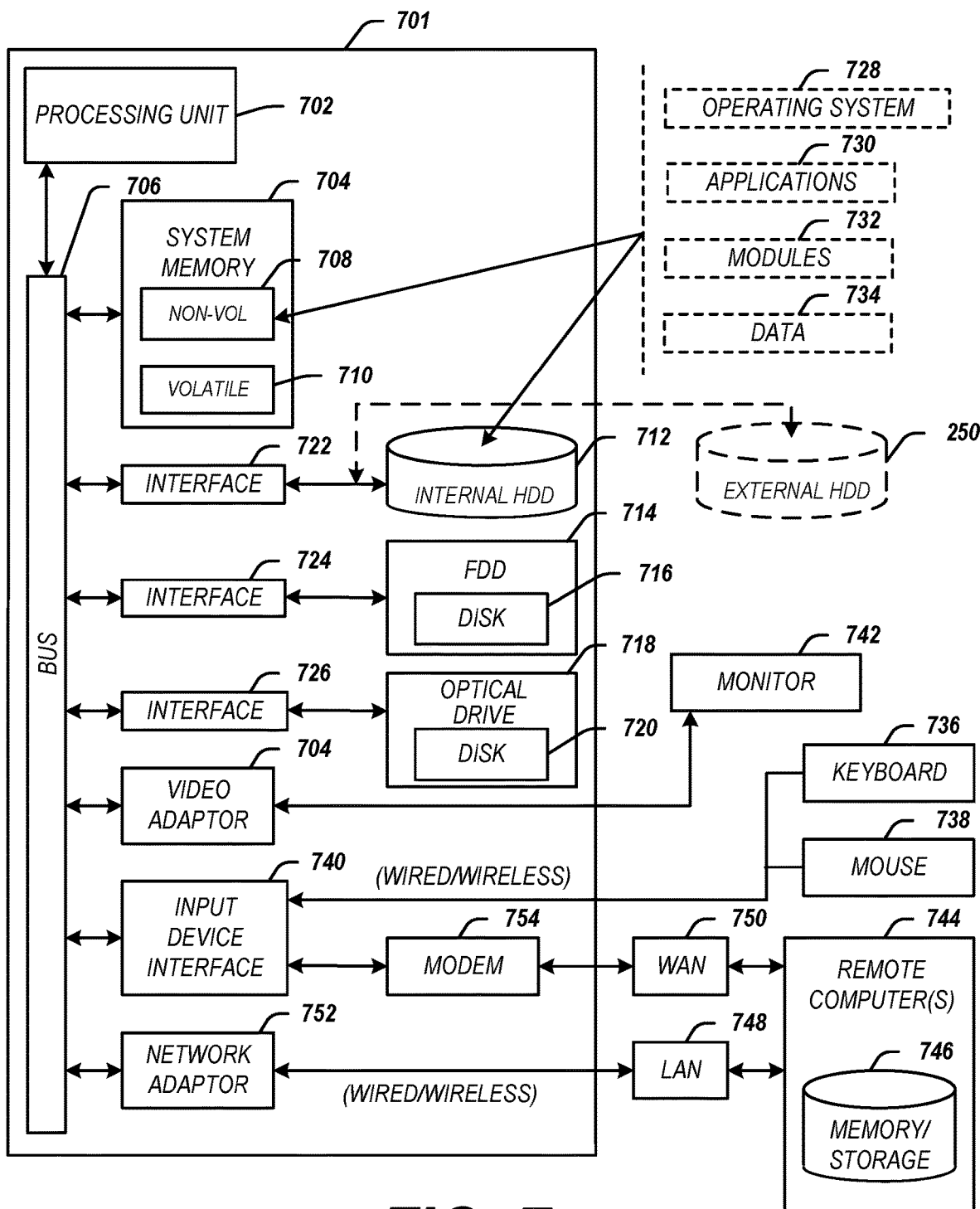
FIG. 7 is a block diagram illustrating an exemplary computing device suitable for use with exemplary embodiments.

The above-described methods may be embodied as instructions on a computer readable medium or as part of a computing architecture. FIG. 7 illustrates an embodiment of an exemplary computing architecture 700 suitable for implementing various embodiments as previously described. In one embodiment, the computing architecture 700 may comprise or be implemented as part of an electronic device, such as a computer 701. The embodiments are not limited in this context.

As used in this application, the terms "system" and "component" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 comprises a processing unit 702, a system memory 704 and a system bus 706. The processing unit 702 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 702.

The system bus 706 provides an interface for system components including, but not limited to, the system memory 704 to the processing unit 702. The system bus 706 can be any of several types of bus structure that may further interconnect to a memory bus (with or without a memory controller), a peripheral bus, and a local bus using any of a variety of commercially available bus architectures. Interface adapters may connect to the system bus 706 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 700 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 704 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 7, the system memory 704 can include non-volatile memory 708 and/or volatile memory 710. A basic input/output system (BIOS) can be stored in the non-volatile memory 708.

The computing architecture 700 may include various types of computer-readable storage media in the form of one or more lower speed memory units, including an internal (or external) hard disk drive (HDD) 712, a magnetic floppy disk drive (FDD) 714 to read from or write to a removable magnetic disk 716, and an optical disk drive 718 to read from or write to a removable optical disk 720 (e.g., a CD-ROM or DVD). The HDD 712, FDD 714 and optical disk drive 720 can be connected to the system bus 706 by an HDD interface 722, an FDD interface 724 and an optical drive interface 726, respectively. The HDD interface 722 for external drive implementations can include at least one or both of Universal Serial Bus (USB) and IEEE 694 interface technologies.

The drives and associated computer-readable media provide volatile and/or nonvolatile storage of data, data structures, computer-executable instructions, and so forth. For example, a number of program modules can be stored in the drives and memory units 708, 712, including an operating system 728, one or more application programs 730, other program modules 732, and program data 734. In one embodiment, the one or more application programs 730, other program modules 732, and program data 734 can include, for example, the various applications and/or components of the messaging system 500.

A user can enter commands and information into the computer 701 through one or more wire/wireless input devices, for example, a keyboard 736 and a pointing device, such as a mouse 738. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 702 through an input device interface 740 that is coupled to the system bus 706, but can be connected by other interfaces such as a parallel port, IEEE 694 serial port, a game port, a USB port, an IR interface, and so forth.

A monitor 742 or other type of display device is also connected to the system bus 706 via an interface, such as a video adaptor 744. The monitor 742 may be internal or external to the computer 701. In addition to the monitor 742, a computer typically includes other peripheral output devices, such as speakers, printers, and so forth.

The computer 701 may operate in a networked environment using logical connections via wire and/or wireless communications to one or more remote computers, such as a remote computer 744. The remote computer 744 can be a workstation, a server computer, a router, a personal computer, portable computer, microprocessor-based entertainment appliance, a peer device or other common network node, and typically includes many or all of the elements described relative to the computer 701, although, for purposes of brevity, only a memory/storage device 746 is illustrated. The logical connections depicted include wire/wireless connectivity to a local area network (LAN) 748 and/or larger networks, for example, a wide area network (WAN) 750. Such LAN and WAN networking environments are commonplace in offices and companies, and facilitate enterprise-wide computer networks, such as intranets, all of which may connect to a global communications network, for example, the Internet.

When used in a LAN networking environment, the computer 701 is connected to the LAN 748 through a wire and/or wireless communication network interface or adaptor 752. The adaptor 752 can facilitate wire and/or wireless communications to the LAN 748, which may also include a wireless access point disposed thereon for communicating with the wireless functionality of the adaptor 752.

When used in a WAN networking environment, the computer 701 can include a modem 754, or is connected to a communications server on the WAN 750, or has other means for establishing communications over the WAN 750, such as by way of the Internet. The modem 754, which can be internal or external and a wire and/or wireless device, connects to the system bus 706 via the input device interface 740. In a networked environment, program modules depicted relative to the computer 701, or portions thereof, can be stored in the remote memory/storage device 746. It will be appreciated that the network connections shown are exemplary and other means of establishing a communications link between the computers can be used.

The computer 701 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 8:
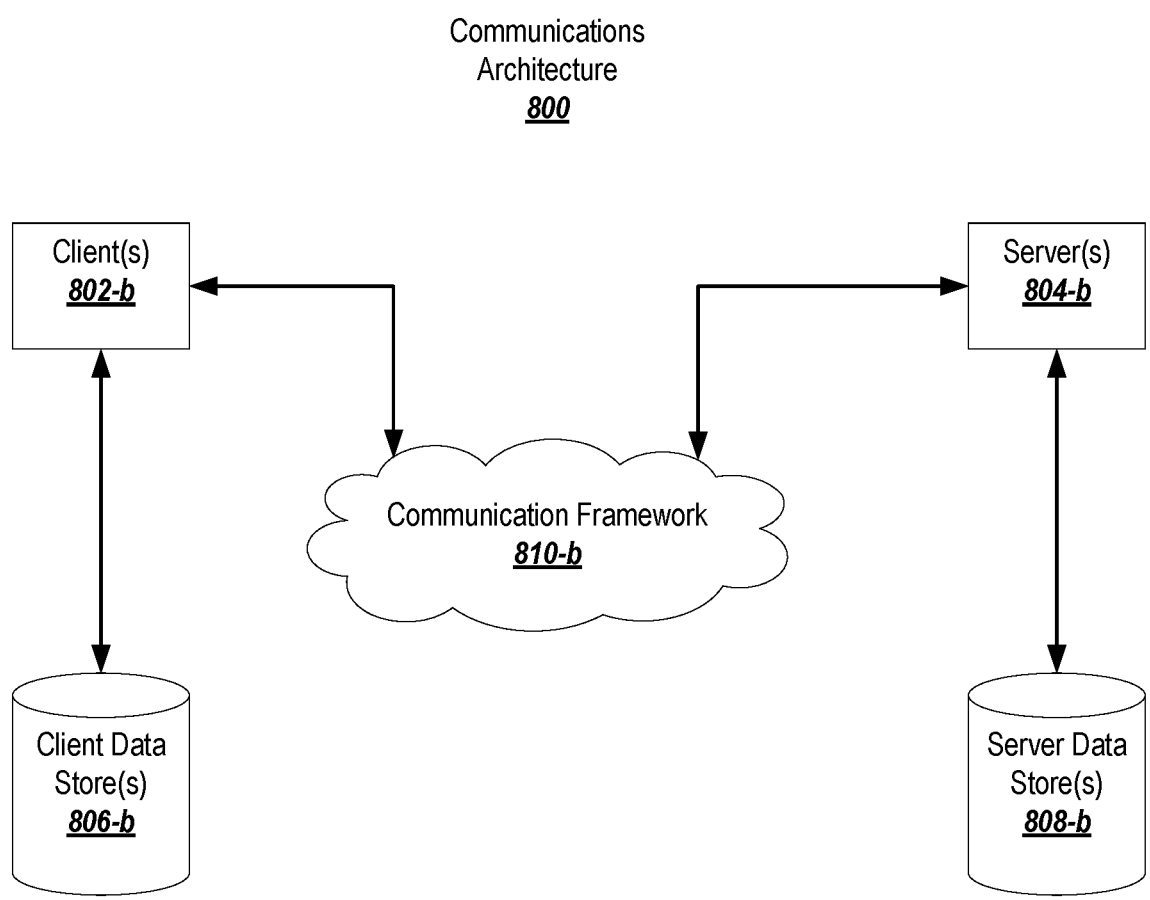
FIG. 8 depicts an exemplary communication architecture.

FIG. 8 is a block diagram depicting an exemplary communications architecture 800 suitable for implementing various embodiments as previously described. The communications architecture 800 includes various common communications elements, such as a transmitter, receiver, transceiver, radio, network interface, baseband processor, antenna, amplifiers, filters, power supplies, and so forth. The embodiments, however, are not limited to implementation by the communications architecture 800.

As shown in FIG. 8, the communications architecture 800 includes one or more clients 802 and servers 804. The clients 802 may implement the client device 510. The servers 804 may implement the server device 526. The clients 802 and the servers 804 are operatively connected to one or more respective client data stores 806 and server data stores 808 that can be employed to store information local to the respective clients 802 and servers 804, such as cookies and/or associated contextual information.

The clients 802 and the servers 804 may communicate information between each other using a communication framework 810. The communications framework 810 may implement any well-known communications techniques and protocols. The communications framework 810 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 810 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.8a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 802 and the servers 804. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 9:
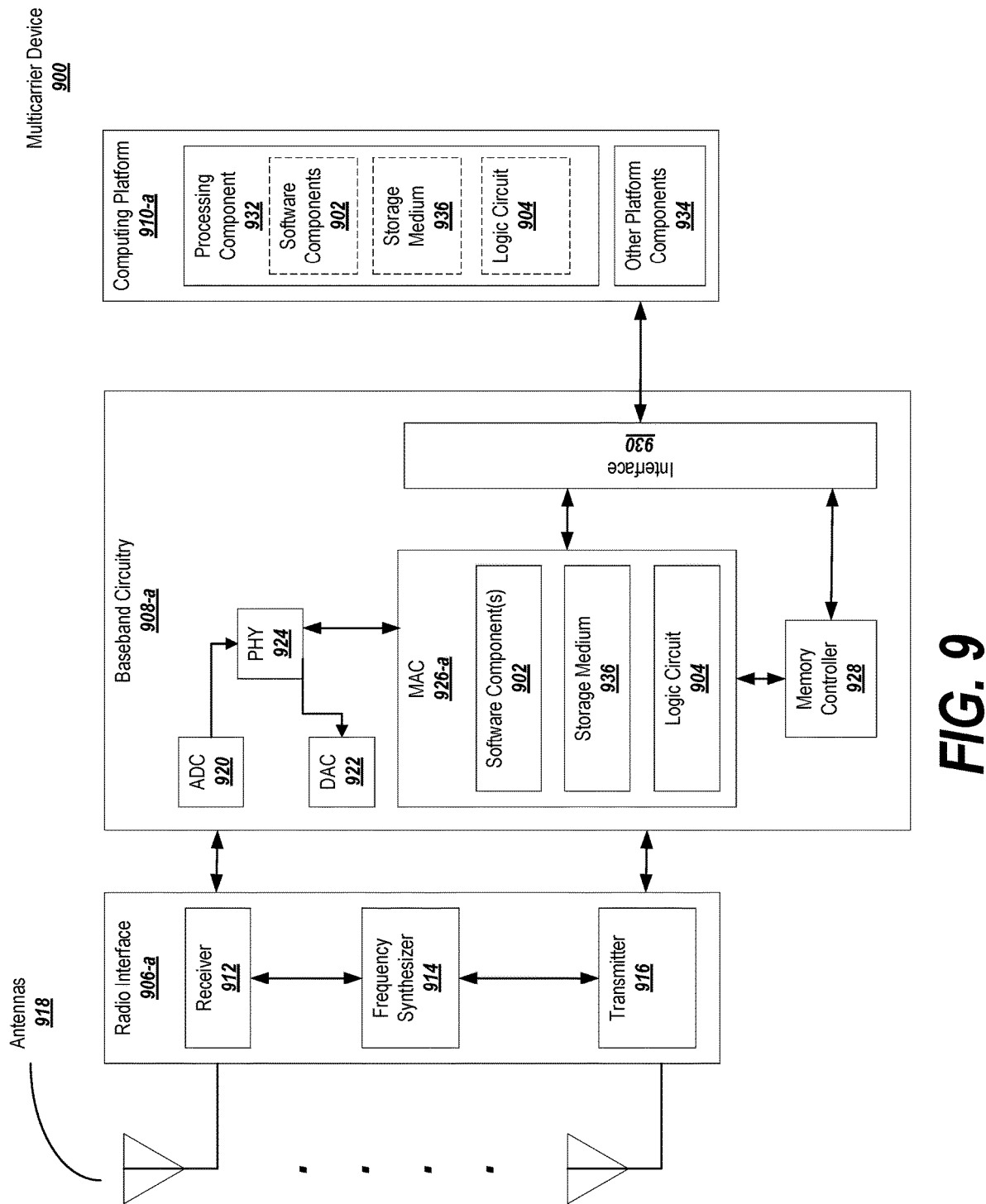
FIG. 9 is a block diagram depicting an exemplary multicarrier communications device.

FIG. 9 illustrates an embodiment of a device 900 for use in a multicarrier OFDM system, such as the messaging system 500. The device 900 may implement, for example, software components 902 as described with reference to the messaging component logic 600, the intent determination logic 700, and the group selection logic 800. The device 900 may also implement a logic circuit 904. The logic circuit 904 may include physical circuits to perform operations described for the messaging system 600. As shown in FIG. 9, device 900 may include a radio interface 906, baseband circuitry 908, and a computing platform 910, although embodiments are not limited to this configuration.

The device 900 may implement some or all of the structure and/or operations for the messaging system 500 and/or logic circuit 904 in a single computing entity, such as entirely within a single device. Alternatively, the device 900 may distribute portions of the structure and/or operations for the messaging system 600 and/or logic circuit 904 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, the radio interface 906 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. The radio interface 906 may include, for example, a receiver 912, a transmitter 914 and/or a frequency synthesizer 916. The radio interface 906 may include bias controls, a crystal oscillator and/or one or more antennas 918. In another embodiment, the radio interface 906 may use external voltage-controlled oscillators (VCOs), surface acoustic wave filters, intermediate frequency (IF) filters and/or RF filters, as desired. Due to the variety of potential RF interface designs an expansive description thereof is omitted.

The baseband circuitry 908 may communicate with the radio interface 906 to process receive and/or transmit signals and may include, for example, an analog-to-digital converter 920 for down converting received signals, and a digital-to-analog converter 922 for up-converting signals for transmission. Further, the baseband circuitry 908 may include a baseband or physical layer (PHY) processing circuit 924 for PHY link layer processing of respective receive/transmit signals. The baseband circuitry 908 may include, for example, a processing circuit 926 for medium access control (MAC)/data link layer processing. The baseband circuitry 908 may include a memory controller 928 for communicating with the processing circuit 926 and/or a computing platform 910, for example, via one or more interfaces 930.

In some embodiments, the PHY processing circuit 924 may include a frame construction and/or detection module, in combination with additional circuitry such as a buffer memory, to construct and/or deconstruct communication frames, such as radio frames. Alternatively or in addition, the MAC processing circuit 926 may share processing for certain of these functions or perform these processes independent of the PHY processing circuit 924. In some embodiments, MAC and PHY processing may be integrated into a single circuit.

The computing platform 910 may provide computing functionality for the device 900. As shown, the computing platform 910 may include a processing component 932. In addition to, or alternatively of, the baseband circuitry 908, the device 900 may execute processing operations or logic for the messaging system 500 and logic circuit 904 using the processing component 932. The processing component 932 (and/or the PHY 924 and/or MAC 926) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 910 may further include other platform components 934. Other platform components 934 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

The device 900 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of the device 900 described herein, may be included or omitted in various embodiments of the device 900, as suitably desired. In some embodiments, the device 900 may be configured to be compatible with protocols and frequencies associated one or more of the 3GPP LTE Specifications and/or IEEE 1402.16 Standards for WMANs, and/or other broadband wireless networks, cited herein, although the embodiments are not limited in this respect.

Embodiments of device 900 may be implemented using single input single output (SISO) architectures. However, certain implementations may include multiple antennas (e.g., antennas 918) for transmission and/or reception using adaptive antenna techniques for beamforming or spatial division multiple access (SDMA) and/or using MIMO communication techniques.

The components and features of the device 900 may be implemented using any combination of discrete circuitry, application specific integrated circuits (ASICs), logic gates and/or single chip architectures. Further, the features of the device 900 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary device 900 shown in the block diagram of FIG. 9 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

At least one computer-readable storage medium 936 may include instructions that, when executed, cause a system to perform any of the computer-implemented methods described herein.

General Notes on Terminology

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A method comprising:
receiving, at a virtual agent, an inquiry on behalf of a first user;
accessing a social graph associated with the first user on a social networking service;
identifying information using the social graph that is responsive to the inquiry;
programmatically generating an output to the inquiry based on the identified information; and
using the virtual agent to report the output to a recipient, wherein the virtual agent generates language to communicate the output in a manner that is personalized to the first user based on personalization data obtained from the first user's social graph, and the language is personalized by applying a personal language model customized to the first user based on the first user's social graph.

2. The method of claim 1, wherein the inquiry is received from a second user different from the first user.

3. The method of claim 1, wherein the inquiry is received by a first virtual agent, and the inquiry is received from second virtual agent.

4. The method of claim 1, wherein generating the output comprises applying a natural language generator, the natural language generator personalized based on the social graph.

5. The method of claim 1, further comprising:
identifying a user who originated the inquiry and a virtual agent associated with the user who originated the inquiry;
determining a level of access for information in the social graph assigned to the user who originated the inquiry;
attempting to access the identified information using the virtual agent with the level of access assigned to the user who originated the inquiry; and
transmitting the output to the user who originated the inquiry when the user who originated the inquiry is permitted to view the identified information, or refraining from transmitting the output to the user who originated the inquiry when the user who originated the inquiry is not permitted to view the information.

6. The method of claim 1, wherein the output comprises an artificially generated voice, the voice personalized based on the social graph.

7. A non-transitory computer-readable medium storing instructions that, when executed by one or more processors, cause the one or more processors to:
receive, at a virtual agent, an inquiry on behalf of a first user;
access a social graph associated with the first user on a social networking service;
identify information using the social graph that is responsive to the inquiry;
programmatically generate an output to the inquiry based on the identified information; and
use the virtual agent to report the output to a recipient, wherein the virtual agent generates language to communicate the output in a manner that is personalized to the first user based on personalization data obtained from the first user's social graph, and the language is personalized by applying a personal language model customized to the first user based on the first user's social graph.

8. The medium of claim 7, wherein the inquiry is received from a second user different from the first user.

9. The medium of claim 7, wherein the inquiry is received by a first virtual agent, and the inquiry is received from second virtual agent.

10. The medium of claim 7, wherein generating the output comprises applying a natural language generator, the natural language generator personalized based on the social graph.

11. The medium of claim 7, further storing instructions for:
identifying a user who originated the inquiry and a virtual agent associated with the user who originated the inquiry;
determining a level of access for information in the social graph assigned to the user who originated the inquiry;
attempting to access the identified information using the virtual agent with the level of access assigned to the user who originated the inquiry; and
transmitting the output to the user who originated the inquiry when the user who originated the inquiry is permitted to view the identified information, or refraining from transmitting the output to the user who originated the inquiry when the user who originated the inquiry is not permitted to view the information.

12. The medium of claim 7, wherein the output comprises an artificially generated voice, the voice personalized based on the social graph.

13. An apparatus comprising:
a processor circuit;
a network interface configured to receive, at a virtual agent, an inquiry on behalf of a first user;
social networking interface logic executable on the processor circuit and configured to access a social graph associated with the first user on a social networking service;
response logic executable on the processor circuit and configured to identify information using the social graph that is responsive to the inquiry; and
output generation logic executable on the processor circuit and configured to programmatically generate an output to the inquiry based on the identified information and to use the virtual agent to report the output to a recipient, wherein the virtual agent generates language to communicate the output in a manner that is personalized to the first user based on personalization data obtained from the first user's social graph, and the language is personalized by applying a personal language model customized to the first user based on the first user's social graph.

14. The apparatus of claim 13, wherein the inquiry is received from a second user different from the first user.

15. The apparatus of claim 13, wherein the inquiry is received by a first virtual agent, and the inquiry is received from second virtual agent.

16. The apparatus of claim 13, wherein generating the output comprises applying a natural language generator, the natural language generator personalized based on the social graph.

17. The apparatus of claim 13, further comprising information security logic configured to:
- identify a user who originated the inquiry and a virtual agent associated with the user who originated the inquiry;
- determine a level of access for information in the social graph assigned to the user who originated the inquiry;
- attempt to access the identified information using the virtual agent with the level of access assigned to the user who originated the inquiry; and
- transmit the output to the user who originated the inquiry when the user who originated the inquiry is permitted to view the identified information, or refraining from transmitting the output to the user who originated the inquiry when the user who originated the inquiry is not permitted to view the information.

18. The method of claim 5, wherein the virtual agent is a first virtual agent, and refraining from transmitting the output to the user who originated the inquiry comprises using a second virtual agent to interact with the first virtual agent to respond to the inquiry without revealing non-authorized information.

\* \* \* \* \*